US009399687B2

(12) United States Patent
Ohara et al.

(10) Patent No.: US 9,399,687 B2
(45) Date of Patent: Jul. 26, 2016

(54) METHOD AND APPARATUS FOR PRODUCING CHLORINATED VINYL CHLORIDE-BASED RESIN

(71) Applicant: KANEKA CORPORATION, Osaka-shi, Osaka (JP)

(72) Inventors: Daichi Ohara, Takasago (JP); Tadashi Tadokoro, Osaka (JP); Tetsuo Inaoka, Settsu (JP); Kiyoshi Horiuchi, Takasago (JP)

(73) Assignee: KANEKA CORPORTION, Osaka-Shi (JP)

( * ) Notice: Subject to any disclaimer, the term of this patent is extended or adjusted under 35 U.S.C. 154(b) by 0 days.

(21) Appl. No.: 14/411,818

(22) PCT Filed: Mar. 26, 2014

(86) PCT No.: PCT/JP2014/058560
§ 371 (c)(1),
(2) Date: Dec. 29, 2014

(87) PCT Pub. No.: WO2014/157346
PCT Pub. Date: Oct. 2, 2014

(65) Prior Publication Data
US 2015/0148445 A1 May 28, 2015

(30) Foreign Application Priority Data
Mar. 29, 2013 (JP) .................................. 2013-074470

(51) Int. Cl.
*C08L 27/24* (2006.01)
*C08L 9/06* (2006.01)
*C08F 14/06* (2006.01)
*C08F 8/22* (2006.01)
*B01J 19/12* (2006.01)

(52) U.S. Cl.
CPC ............... *C08F 14/06* (2013.01); *B01J 19/121* (2013.01); *B01J 19/123* (2013.01); *C08F 8/22* (2013.01); *C08L 27/24* (2013.01); *B01J 2219/1203* (2013.01)

(58) Field of Classification Search
CPC ............ C08F 14/06; C08F 8/22; C08L 27/24; B01J 19/121; B01J 19/123; B01J 2219/1203
See application file for complete search history.

(56) References Cited

U.S. PATENT DOCUMENTS

| | | | | |
|---|---|---|---|---|
| 3,532,612 A | | 10/1970 | Weben | |
| 3,532,773 A | * | 10/1970 | Gerhard et al. | 522/4 |
| 3,621,078 A | * | 11/1971 | Kitamura et al. | 522/132 |
| 3,725,359 A | * | 4/1973 | Goswami et al. | 525/326.6 |
| 3,862,264 A | * | 1/1975 | Nojima et al. | 524/399 |
| 4,006,126 A | * | 2/1977 | Rettore et al. | 522/132 |
| 4,350,798 A | * | 9/1982 | Parker | 522/132 |
| 4,412,898 A | * | 11/1983 | Olson et al. | 522/132 |
| 4,459,387 A | * | 7/1984 | Parker | 522/132 |
| 2004/0048945 A1 | | 3/2004 | Ueshima et al. | |
| 2007/0173611 A1 | | 7/2007 | Yoshimi et al. | |
| 2010/0122224 A1 | * | 5/2010 | Lucas et al. | 716/4 |
| 2010/0324299 A1 | * | 12/2010 | Yoshikawa et al. | 546/345 |
| 2014/0309325 A1 | | 10/2014 | Inaoka et al. | |

FOREIGN PATENT DOCUMENTS

| | | | |
|---|---|---|---|
| GB | 1131318 A | * | 10/1968 |
| JP | 52-15638 | | 5/1977 |
| JP | 63-145305 A | | 6/1988 |
| JP | 6-100618 A | | 4/1994 |
| JP | 10-279627 A | | 10/1998 |
| JP | 2002-275213 A | | 9/2002 |
| JP | 2003-183320 A | | 7/2003 |
| JP | 2003-277436 A | | 10/2003 |
| JP | 2008-38129 A | | 2/2008 |
| KR | 84-1755 B1 | | 10/1984 |
| WO | WO 2010127841 A2 | * | 11/2010 |
| WO | WO 2013/069542 A1 | | 5/2013 |

OTHER PUBLICATIONS

International Search Report issued Jun. 17, 2014, in PCT International Application No. PCT/JP2014/058560.
English language translation of International Preliminary Report on Patentability for PCT/JP2014/058560 dated Oct. 8, 2015.
Chinese Office Action for Application No. 201480001706.8 dated Aug. 5, 2015 with English language translation.

* cited by examiner

*Primary Examiner* — Sanza McClendon
(74) *Attorney, Agent, or Firm* — Birch, Stewart, Kolasch & Birch, LLP

(57) ABSTRACT

According to a method of the present invention for producing a CPVC resin, the method includes the steps of: introducing chlorine into a slurry of a PVC resin in a first tank; transferring, from the first tank to a second tank, the slurry into which chlorine has been introduced; and irradiating, with UV light, the slurry in the second tank. This method improves an amount of chlorine dissolved into the slurry of the PVC resin and consequently, improves production efficiency of the CPVC resin.

12 Claims, 18 Drawing Sheets

F I G. 1
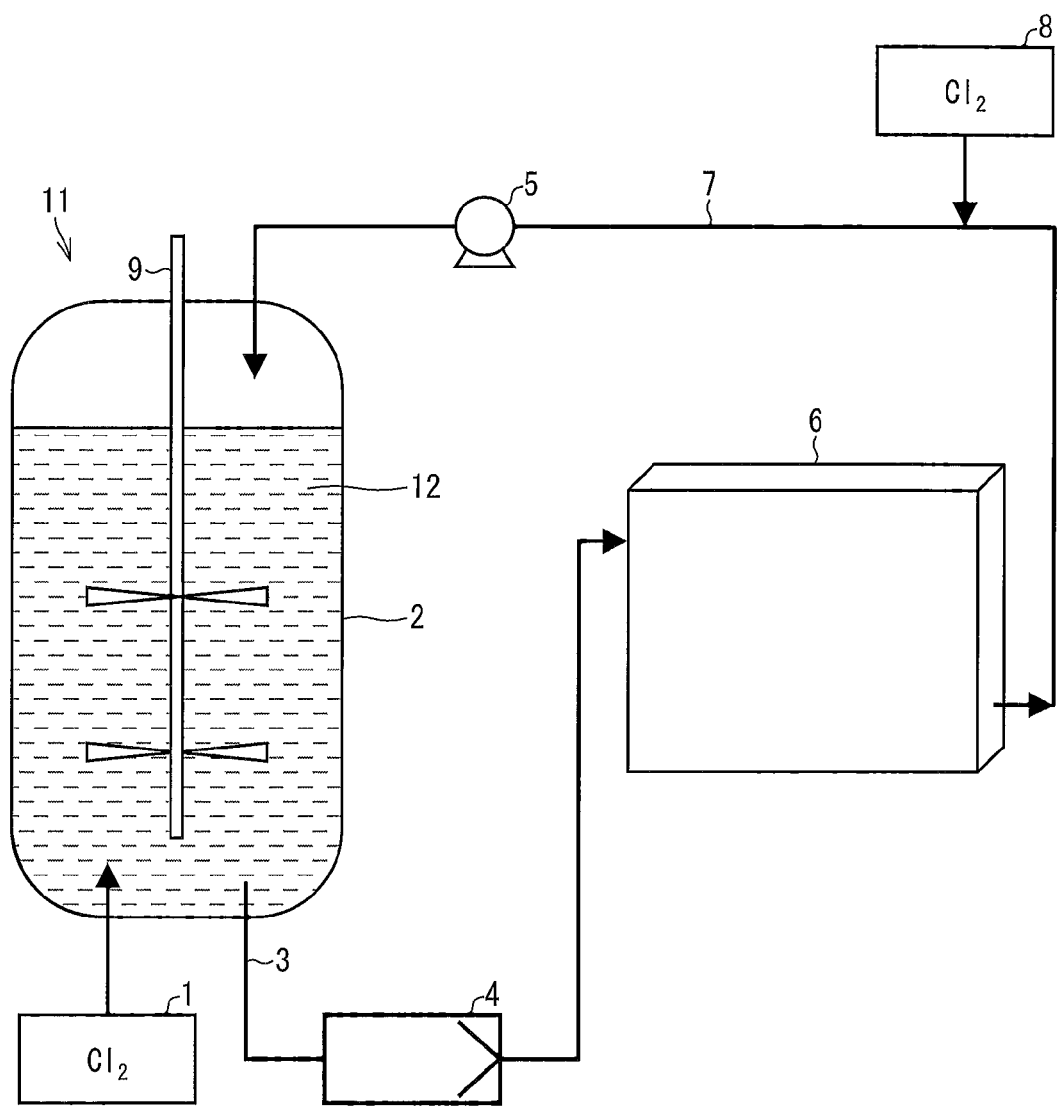

F I G. 4
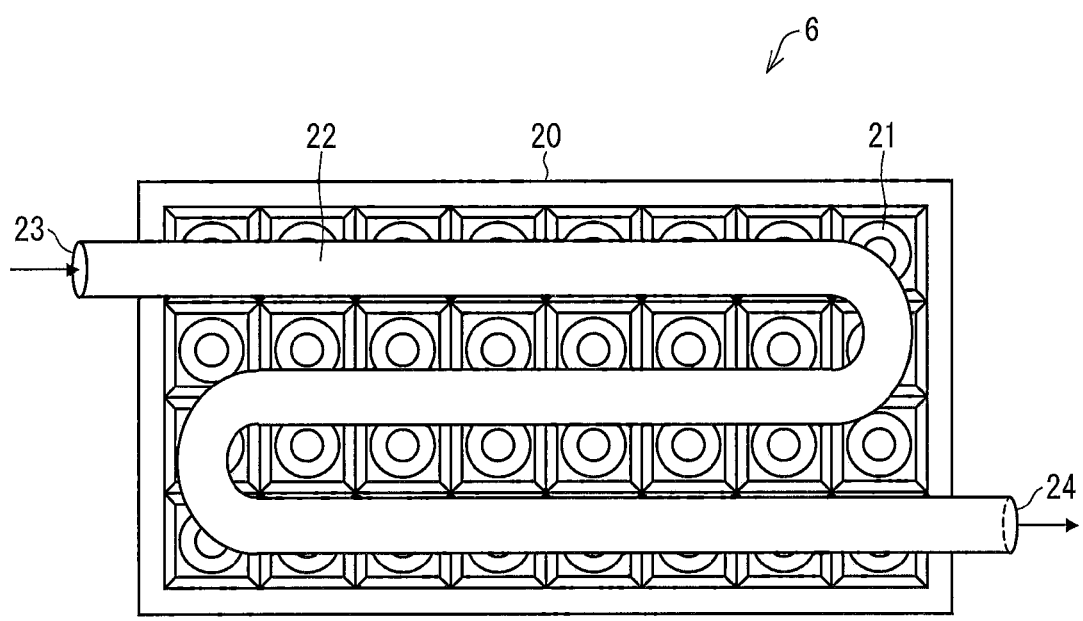

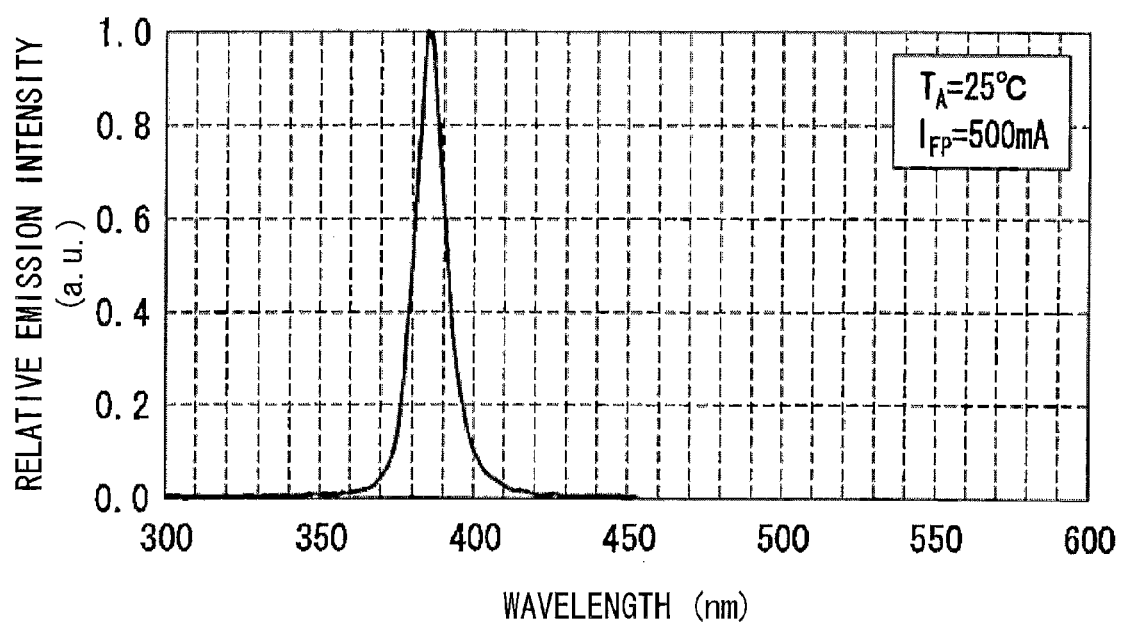
F I G. 1 5

F I G. 1 7
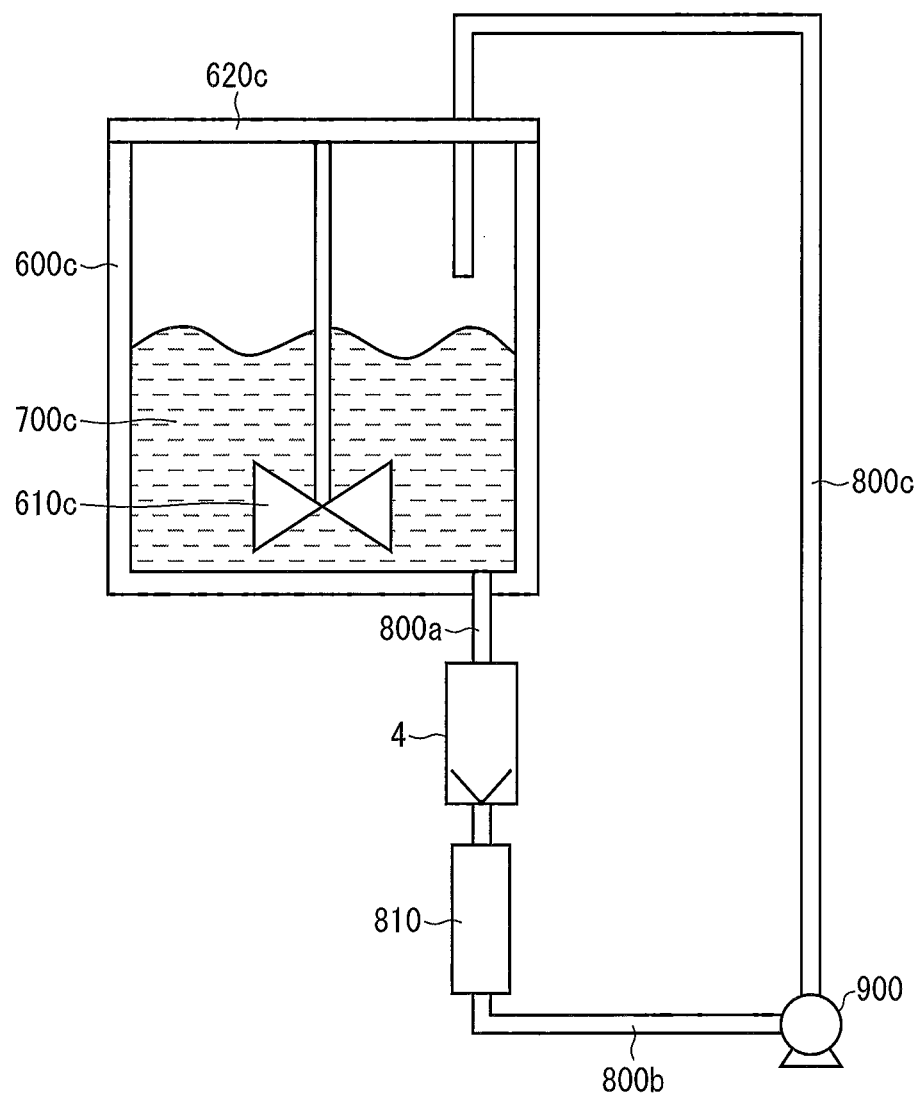

METHOD AND APPARATUS FOR PRODUCING CHLORINATED VINYL CHLORIDE-BASED RESIN

TECHNICAL FIELD

The present invention relates to a method and an apparatus for producing a chlorinated vinyl chloride-based resin (chlorinated polyvinyl chloride; hereinafter, simply referred to as "CPVC resin"), and more specifically, to a method and an apparatus for producing a CPVC resin by photochlorination.

BACKGROUND ART

Due to chlorination, CPVC resins have a higher upper temperature limit as compared to vinyl chloride-based resins (vinyl chloride resins, polyvinyl chloride; hereinafter, simply referred to as "PVC resin"). Accordingly, CPVC resins are used in various fields such as fields of heat-resistant pipes, heat-resistant industrial plates, heat-resistant films, and heat-resistant sheets.

In general, a CPVC resin is produced by chlorinating a PVC resin by supplying chlorine into an aqueous slurry that has been obtained by suspending PVC resin particles in an aqueous medium. Typically, in a case where chlorination is carried out by photochlorination, UV irradiation is carried out by use of a mercury lamp so as to produce chlorine radicals (Patent Literature 1).

Further, there is a report on a method of obtaining chlorinated polyolefin particulates in one reaction tank. According to this method, by the step of dissolving chlorine into an aqueous slurry containing polyolefin particulates under a condition where no radical is produced, chlorine is penetrated into the particulates. Then, the step of chlorinating the particulates is carried out by heating or/and light irradiation. By repeating these two steps of dissolving and chlorinating alternately, chlorinated polyolefin particulates are obtained (Patent Literature 2).

In the above production method, a chlorination reaction is carried out by putting a mercury lamp 102 that is protected by a glass tube 101 in an aqueous slurry 105 of a PVC resin, as illustrated in FIG. 7.

CITATION LIST

Patent Literatures

Patent Literature 1
Japanese Patent Application Publication, Tokukaihei, No. 10-279627
Patent Literature Japanese Patent Application Publication, Tokukaihei, No. 6-100618

SUMMARY OF INVENTION

Technical Problem

In the above-described methods of producing a CPVC resin, in general, when chlorine is supplied into a slurry in which a PVC resin is dispersed, pressure is applied inside a reactor vessel so that an amount of chlorine dissolved in the slurry is increased. However, in a case where an internal pressure inside the reactor vessel is increased too much, a glass tube covering a mercury lamp may be damaged. Meanwhile, pressure resistance is improved when a thickness of the glass tube is increased. However, in such a case, UV light emitted for irradiation from the mercury lamp is absorbed by glass and reaction efficiency deteriorates.

Solution to Problem

In order to solve the above problems, the inventors of the present invention made diligent studies. As a result of such studies, the inventors of the present invention found found the followings. That is, the inventors found that an amount of chlorine dissolved in a slurry can be increased, by (i) separately providing a chlorine introduction tank into which chlorine is introduced and a reaction tank where a photochlorination reaction is carried out by UV irradiation and (ii) increasing a pressure inside the chlorine introduction tank. As a result of such finding, the inventors achieved the present invention. In other words, the present invention encompasses the following inventions.

A method for producing a chlorinated vinyl chloride-based resin, the method including the steps of: introducing chlorine into a slurry of a vinyl chloride-based resin in a first tank; transferring, from the first tank to a second tank, the slurry into which chlorine has been introduced; and irradiating, with UV light, the slurry in the second tank.

An apparatus for producing a chlorinated vinyl chloride-based resin, the apparatus including: a first tank where chlorine is introduced into a slurry of a vinyl chloride-based resin; and a second tank into which the slurry is introduced from the first tank and in which chlorination is carried out, the second tank being provided with a light source for UV irradiation to the slurry.

Advantageous Effects of Invention

The method of the present invention of producing a CPVC resin or an apparatus of the present invention for producing a CPVC resin advantageously improves an amount of chlorine dissolved in a slurry of a PVC resin and for example, accordingly improves reaction efficiency in production of the CPVC resin.

BRIEF DESCRIPTION OF DRAWINGS

FIG. 1 is a view schematically illustrating an apparatus of one embodiment of the present invention for producing a CPVC resin.

FIG. 4 is a view schematically illustrating one example of a second tank for UV irradiation in an apparatus of one embodiment of the present invention for producing a CPVC resin.

FIG. 15 is a view showing an emission spectrum of one example of a UV LED that is used in Reference Examples.

FIG. 17 is a view schematically illustrating an apparatus for producing a CPVC resin, which apparatus includes a UV LED light source device and a reactor vessel that are used in Examples.

DESCRIPTION OF EMBODIMENTS

Figure 2:
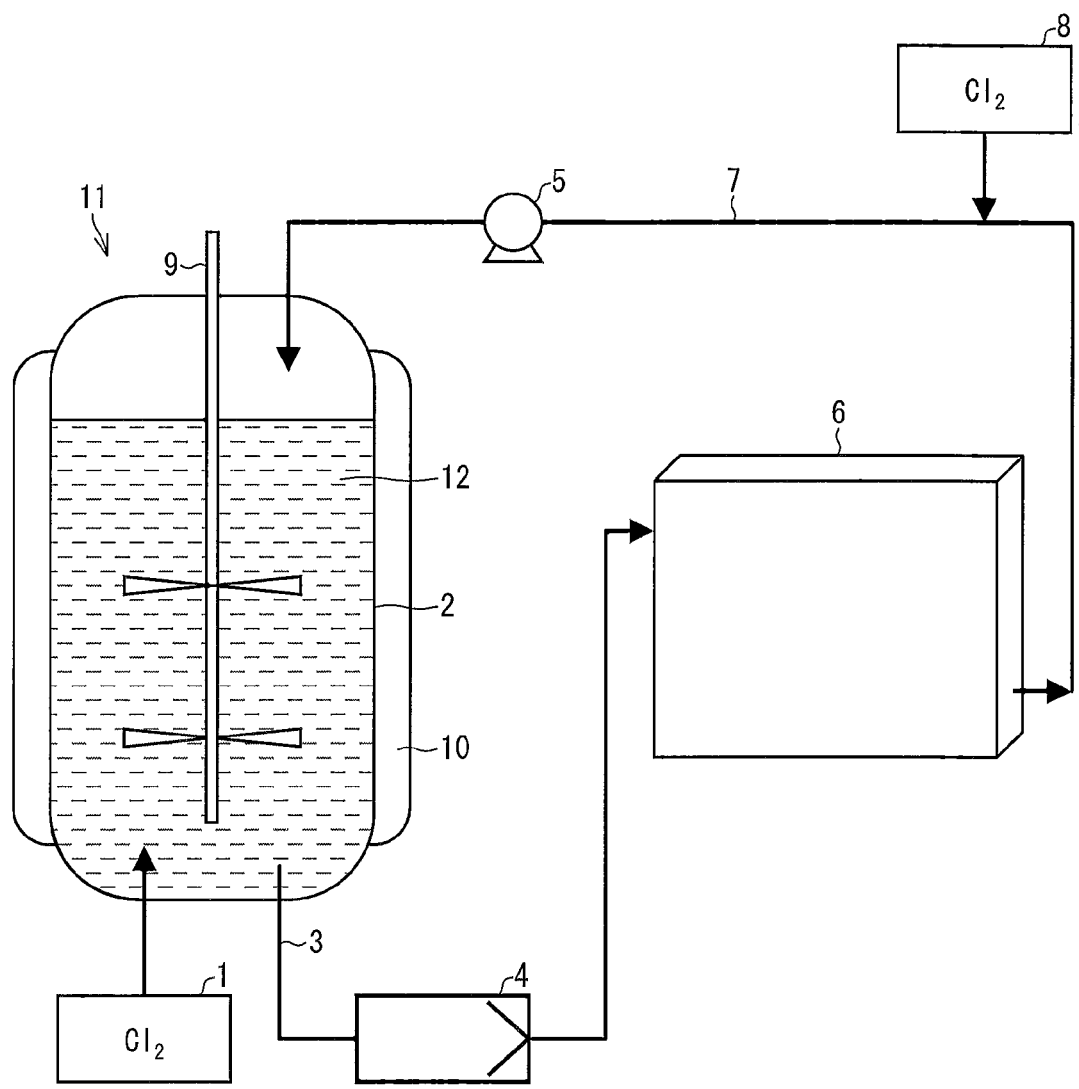
FIG. 2 is a view schematically illustrating an apparatus of another embodiment of the present invention for producing a CPVC resin.

The following discusses one embodiment of the present invention in detail. Note that all Scientific Literatures and Patent Literatures cited in the present Specification are incorporated herein by reference. In addition, note that unless specifically noted otherwise, (i) "A to B" indicative of a numerical range means "A or more (including A and greater than A) and B or less (including B and less than B)" in the present Specification, (ii) "%" indicates "mass %", and (iii) "part(s)" means "part(s) by weigh".

A method (hereinafter, simply referred to as "the production method") according to the present invention for producing a CPVC resin only needs to include the steps of: (i) introducing chlorine into a slurry of a PVC resin in a first tank; and (ii) after transferring, from the first tank to a second tank, the slurry into which chlorine has been introduced, irradiating, with UV light, the slurry in the second tank. Other specific steps, conditions, materials, equipment, etc. are not specifically limited.

In other words, the production method is characterized by separating (i) a tank in which chlorine is supplied into a slurry of a PVC resin and (ii) a tank in which a photochlorination reaction is carried out by UV irradiation to the slurry of the PVC resin which slurry contains chlorine. This arrangement makes it possible to increase a pressure inside the first tank into which chlorine is introduced. This improves an amount of chlorine dissolved in the slurry of the PVC resin and, for example, consequently improves reaction efficiency in production of a CPVC resin.

Moreover, it has been necessary to remove heat from a tank in a conventional production method according to which introduction of chlorine and light irradiation are simultaneously carried out. This is because heat is generated in a photochlorination reaction. However, in an arrangement of the production method, the first tank for introduction of chlorine is separated from the second tank for carrying out a photochlorination reaction. Accordingly, in the production method, it is not necessary to remove heat from the first tank for introduction of chlorine. This makes it possible to reduce equipment cost concerning heat removal. As a method of removing heat from a slurry, for example, there is a method according to which heat removal or cooling is carried out at a duct except a method according to which heat is removed from the first tank. A method of carrying out heat removal or cooling at a duct is not specifically limited. However, heat removal or cooling at the duct can be carried out by use of a method using a duct with a cooling jacket or by "natural cooling" of the duct.

Further, a UV light source can be used as a light source for UV irradiation. Though the light source is not specifically limited, it is preferable to use a light source capable of carrying out irradiation with UV light having a single wavelength. For example, it is preferable to use at least one kind of light source selected from the group consisting of a mercury lamp, a UV LED, an organic EL, an inorganic EL and a UV laser. It is more preferable to use at least one kind of light source selected from the group consisting of a UV LED, an organic EL, an inorganic EL and a UV laser.

The present invention also encompasses an apparatus (hereinafter, simply referred to as a "the production apparatus") for producing a CPVC resin, which apparatus includes: a first tank where chlorine is introduced into a slurry of a PVC resin; and a second tank into which the slurry is introduced from the first tank and in which chlorination is carried out, the second tank being provided with at least one kind of light source selected from the group consisting of a UV LED, an organic EL, an inorganic EL and a UV laser for carrying out UV irradiation to the slurry. The production apparatus is capable of carrying out the production method. Note that the following Embodiment discusses, as one example, an apparatus that uses a UV LED as a light source. However, the light source is not limited to this UV LED, as stated above.

The following discusses in detail the production method and the production apparatus, with reference to drawings. An apparatus 11 for producing a CPVC resin can be used for the production method. As illustrated in FIG. 1, this production apparatus 11 includes: a chlorine introducing section 1 for introducing chlorine gas; a first tank 2 for introducing chlorine into a slurry 12 of a PVC resin; a slurry outlet section 3 for transferring, from the first tank 2 to the second tank 6, the slurry into which chlorine has been introduced; a pressure reducing valve 4 for reducing a pressure of the slurry taken out from the first tank 2; a second tank 6 for carrying out a photochlorination reaction by UV irradiation to the slurry; a slurry circulating line 7 for circulating the slurry from the second tank 6 to the first tank 2; a chlorine introducing section 8 for introducing chlorine gas into the slurry taken out from the second tank 6; a slurry circulating pump 5 for transferring the slurry from the second tank 6 to the first tank 2; and a stirring section 9 for stirring the slurry 12 in the first tank 2.

As long as the first tank 2 is a sealable pressure-resistant container, the first tank 2 is not specifically limited and various types of reaction containers can be used as the first tank 2. Further, there is no limitation in a specific arrangement of the first tank 2. For example, it is possible to suitably use a well-known tank for production of a CPVC resin. The slurry 12 in which the PVC resin is dispersed is put in the first tank 2, and stirred by the stirring section 9 provided in the first tank 2. In the slurry 12 being stirred, chlorine gas is supplied from the chlorine introducing section 1. The stirring section 9 provided in the first tank 2 is not specifically limited, but can be a stirring blade or the like. For example, the stirring blade may be an axial-flow type such as a propeller blade or a radial-flow type such as a paddle blade or a turbine blade.

Further, the production apparatus 11 preferably includes a pressure applying section for applying a pressure to the first tank 2. This makes it possible to apply a pressure inside the first tank 2. In the production apparatus 11 of the present invention, the chlorine introducing section 1 functions as the pressure applying section. That is, when the chlorine introducing section 1 introduces chlorine gas into the first tank 2, the pressure inside the first tank 2 increases.

The above pressure application improves an amount of chlorine dissolved in the slurry 12. Consequently, this may improve, for example, reaction efficiency at the time when a CPVC resin is produced. The pressure inside the first tank 2 is not specifically limited, but for example, can be in a range of 0.02 MPa to 2.00 MPa. Moreover, the pressure inside the first tank 2 is preferably in a range of 0.04 MPa to 2.00 MPa, more preferably in a range of 0.05 MPa to 2.00 MPa, much more preferably in a range of 0.06 MPa to 1.50 MPa, and further more preferably in a range of 0.08 MPa to 1.20 MPa. In addition, the pressure inside the first tank 2 is more preferably in a range of 0.10 MPa to 1.00 MPa, and particularly preferably in a range of 0.12 MPa to 0.50 MPa. In the above ranges, the pressure inside the first tank 2 can improve reaction efficiency of chlorination.

The slurry 12 into which chlorine has been supplied is taken out through the slurry outlet section 3 provided at the bottom of the first tank 2. Then, via the pressure reducing valve 4 for reducing the pressure of the slurry 12, the slurry is transferred to the second tank 6. The pressure reducing valve 4 can be any of various types of general pressure-reducing valves, and is not specifically limited.

The slurry 12 introduced into the second tank 6 is chlorinated by a photochlorination reaction as a result of UV irradiation to the slurry 12. Then, the slurry 12 taken out from the second tank 6 is transferred back to the first tank 2 via the slurry circulating line 7 and the slurry circulating pump 5. At this time, in the second tank 6, chlorine in the slurry has been consumed by the photochlorination reaction. Accordingly, it is preferable to supply chlorine gas from the chlorine introducing section 8 to the slurry taken out from the second tank 6. It is preferable that before the slurry taken out from the second tank 6 is transferred back to the first tank 2, the chlorine introducing section 8 introduce chlorine gas to the slurry. Further, preferably, the chlorine introducing section 8 supplies chlorine gas to the slurry taken out from the second tank 6, in a manner such that a pressure inside the slurry circulating line 7 does not become a negative pressure, in other words, the pressure inside the slurry circulating line 7 becomes equal to or higher than a negative pressure.

In this way, it is preferable that the production apparatus 11 be provided with a circulating section for circulating, back to the first tank 2, the slurry having been subjected to UV irradiation in the second tank 6. In terms of the production method, it is preferable to circulate, back to the first tank 2, the slurry having been subjected to UV irradiation in the second tank 6. Note that in the present embodiment, examples of the circulating section can be the slurry circulating pump 5, the slurry circulating line 7, etc. This arrangement makes it possible to alternately repeat supply of chlorine and chlorination by UV irradiation, and therefore to easily produce a CPVC resin.

The slurry circulating pump 5 may be any pump as long as the slurry circulating pump 5 can circulate stably a constant amount of the slurry to the first tank 2, and is not specifically limited. The slurry circulating pump 5 is preferably a gear pump or a screw pump, for example. The slurry circulating pump 5 can be made of a material such as ceramics or titanium palladium. Note that, preferably, the material of the slurry circulating pump 5 has a satisfactory resistance to moist chlorine and a satisfactory resistance to hydrogen chloride.

Moreover, as illustrated in FIG. 2, in the production apparatus 11 may be arranged to include a jacket section 10 that covers the first tank 2. The jacket section 10 that covers the first tank 2 has a function of controlling a temperature inside the first tank 2. One example of the jacket section 10 is a jacket for cooling a temperature inside a reactor vessel. By using a cooling jacket, an amount of removed heat and an amount of generated heat can be balanced. This makes it possible to control the temperature inside the first tank 2.

Furthermore, though the number of the second tank 6 is only one in FIG. 1, the number is not specifically limited. It is possible to provide a plurality of second tanks 6. In a case where a plurality of second tanks 6 are provided, the plurality of second tanks 6 may be provided either in series or in parallel. However, in consideration of reaction efficiency, the plurality of second tanks are preferably provided in parallel.

When the slurry 12 is circulated from the second tank 6 to the first tank 2, it is preferable to circulate the slurry 12 so that the slurry 12 is efficiently mixed in the first tank 2. One example of a method of circulating the slurry 12 in such a manner is a method in which, when the slurry 12 is circulated from the second tank 6 to the first tank 2, the slurry 12 is introduced to a gas phase part or a part in the vicinity of a liquid surface in the first tank 2. In other words, preferably, the circulating section introduces the slurry 12 to a gas phase part or a part in the vicinity of a gas-liquid phase boundary in the first tank 2. The following discusses one example of such an arrangement, with reference to FIG. 3. Note to make sure that the arrangement is not limited to the following example, and also that since the arrangement is intended to efficiently mix the slurry 12 in the first tank at the time when the slurry 12 is circulated from the second tank 6 to the first tank 2, the slurry 12 can be circulated to any part within the scope of this intension.

Figure 3:
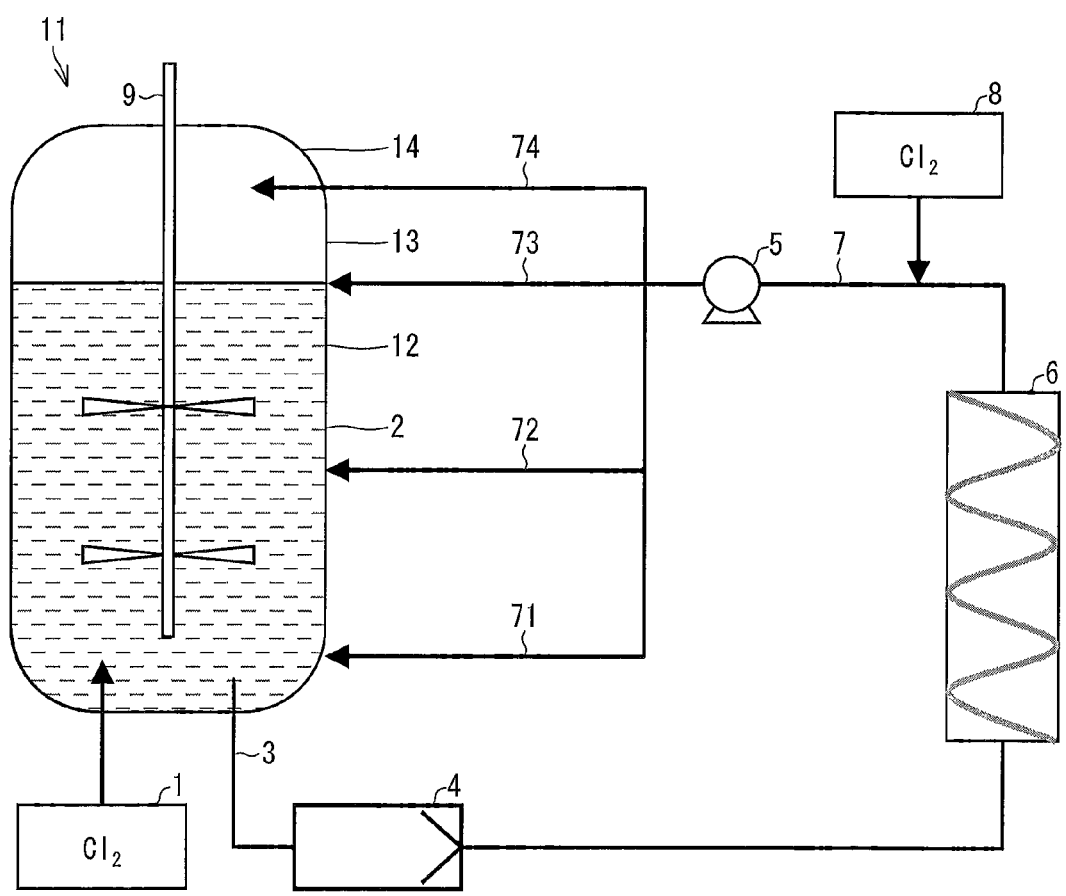
FIG. 3 is a view schematically illustrating a circulation system in an apparatus of one embodiment of the present invention for producing a CPVC resin.

As illustrated in FIG. 3, as a flow route for transferring the slurry 12 from the second tank 6 back to the first tank 2, there are four possible flow routes in a broad sense which include (1) a route 71 that brings the slurry 12 back to a bottom part of the first tank 2, (2) a route 72 that brings the slurry 12 back to a middle part of the first tank 2, (3) a route 73 that brings the slurry 12 back to a part in the vicinity of the gas-liquid phase boundary 13 in the first tank 2, and (4) a route 74 that brings the slurry 12 back to a gas phase part 14 in the first tank 2. Among these four flow routes, the route 74 that brings the slurry 12 back to the gas phase part 14 is particularly preferable. This is because, in a case where the slurry 12 is brought back to the gas phase part 14, the slurry 12 circulated from the second tank 6 is most well-mixed in the first tank 2. The second most preferable route is a route that brings the slurry 12 back to the part in the vicinity of the gas-liquid phase boundary 13. In a structure where the slurry 12 is taken out through the slurry outlet section 3 provided at the bottom of the first tank 2 at the time when the slurry 12 to which chlorine has been supplied is re-transferred to the second tank 6, it becomes possible to sufficiently supply chlorine into the PVC resin by introducing the slurry 12 circulating from the second tank 6 to the gas phase part 14 or the part in the vicinity of the gas-liquid phase boundary 13 in the first tank 2.

Preferably, the second tank 6 includes a transparent duct where the slurry 12 is to flow, and a light source that carries out UV irradiation to the transparent duct. The number of the transparent duct(s) may be one or more, and the number is not specifically limited. Further, the transparent duct is not limited in diameter, shape, and the like, and various transparent ducts can be used. Further, the transparent duct can be made of any material, as long as the material can transmit UV light and also be resistant to production conditions of the CPVC resin (resistant to chlorine, resistant to acid, etc.). Accordingly, the transparent duct is not specifically limited and various ducts can be used. A preferable example of the transparent duct is a glass duct.

The light source only needs to be provided so as to be capable of carrying out UV irradiation to the slurry of the PVC resin flowing in the transparent duct. Accordingly, the light source is not specifically limited in specific arrangement or placement position. For example, by providing a light source(s) at a top part, a bottom part, a lateral part or a combination of two or more of these parts of the transparent duct, it is possible to carry out chlorination by UV irradiation to the slurry of the PVC resin flowing in the transparent duct.

The following further discusses one example of a specific arrangement of the second tank 6, with reference to FIG. 4. The second tank 6 is provided with a UV irradiation panel 20 that has a plurality of UV LED elements 21 and a transparent duct 22 where the slurry 12 of the PVC resin is to flow. Here, only one UV irradiation panel 20 is illustrated in FIG. 4. However, it is preferable to provide another UV irradiation panel 20 so that the another UV irradiation panel 20 faces the one UV irradiation panel 20 and the transparent duct 22 is sandwiched between these two UV irradiation panels 20. In FIG. 4, for convenience of explanation, illustration of a front-side UV irradiation panel 20 is omitted (the same applies to FIGS. 5 and 6).

The transparent duct 22 has a letter S shape that has two bent sections so that UV irradiation in a longer period is achieved. The slurry 12 flows into the transparent duct 22 via a slurry inlet 23. Then, while flowing in the transparent duct 22, the slurry 12 is irradiated with UV light from the UV irradiation panel 20. Thereafter, the slurry 12 flows out of the second tank 6 via a slurry outlet 24.

One example of another embodiment of the transparent duct provided in the second tank 6 can be a transparent duct provided with a static mixer inside the transparent duct. As a result of provision of a static mixer inside the transparent duct, chlorination by UV irradiation can be carried out while the slurry of the PVC resin flowing in the duct is being mixed. This makes it possible to further improve reaction efficiency. The static mixer is not specifically limited in specific arrangement, but any static mixer that is to be provided in any of various ducts can be used.

Figure 5:
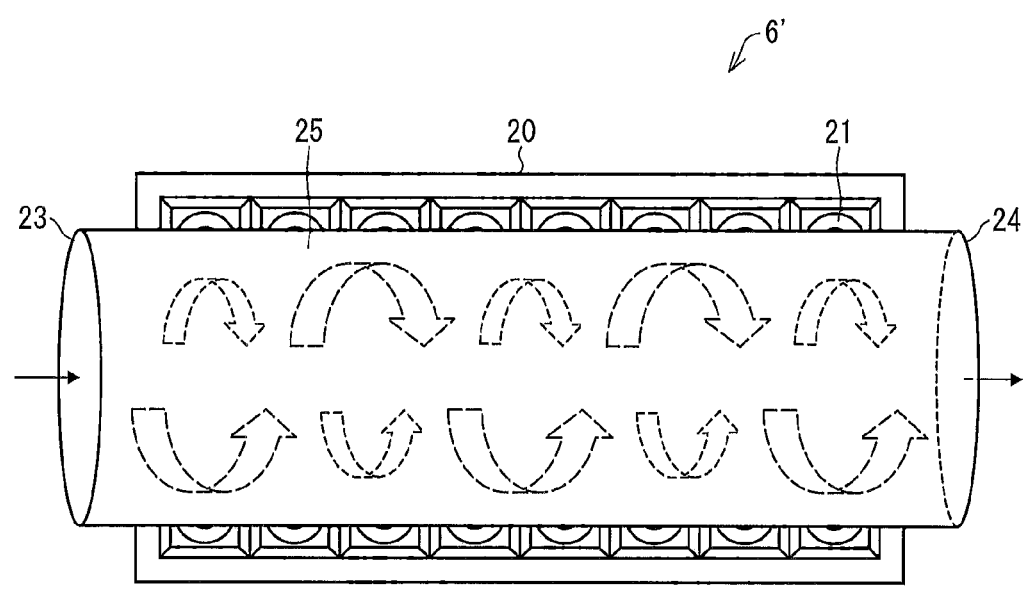
FIG. 5 is a view schematically illustrating another example of a second tank for UV irradiation in an apparatus of one embodiment of the present invention for producing a CPVC resin.

The following specifically discusses one example of the second tank according to the above aspect of the present embodiment, with reference to FIG. 5. A second tank 6' is provided with a UV irradiation panel 20 that has a plurality of UV LED elements 21, and a transparent duct 25 where the slurry of the PVC resin is to flow. The transparent duct 25 is provided therein with a static mixer. As illustrated in FIG. 5, by use of the transparent duct 25 provided with a static mixer, UV irradiation can be carried out while the slurry 12 flown into the transparent duct 25 via the slurry inlet 23 is being stirred. This makes it possible to efficiently carry out a chlorination reaction. Note that as described above, another UV irradiation panel 20 may be provided in the arrangement of FIG. 5 so as to face the aforesaid UV irradiation panel 20 so that the transparent duct 25 is sandwiched between these UV irradiation panels 20.

Further, as another example of the second tank, there is a tank including a metal duct provided with a transparent window in which metal duct the slurry of the PVC resin is to flow, and a light source that carries out UV irradiation to the transparent window. The number of metal duct may be one or more and not specifically limited. Further, the metal duct is not limited in metal material, diameter, shape, and the like, and various metal ducts can be used. Moreover, the transparent window is also not limited in size and shape, as long as the transparent window allows UV irradiation. The transparent window can be made of any material as long as the material can transmit UV light and also be resistant to production conditions of the CPVC resin (resistant to chlorine, resistant to acid, etc.). Accordingly, the transparent window is not specifically limited and various transparent windows can be used. A preferable example of the transparent window is a glass window.

Further, the light source only needs to be provided so as to be capable of carrying out UV irradiation via the transparent window to the slurry of the PVC resin flowing in the metal duct. Accordingly, the light source is not specifically limited in specific arrangement or placement position. For example, by providing a light source(s) at a top part, a bottom part, a lateral part or a combination of two or more of these parts of the transparent window, it is possible to carry out chlorination by UV irradiation via the transparent window to the slurry of the PVC resin flowing in the transparent duct.

Figure 6:
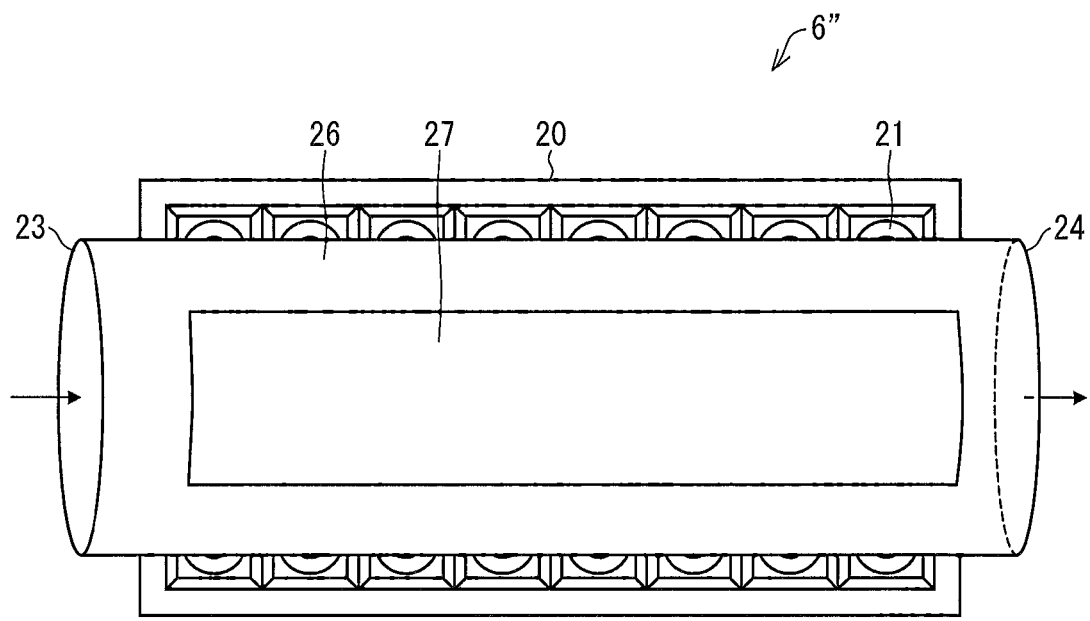
FIG. 6 is a view schematically illustrating still another example of a second tank for UV irradiation in an apparatus of one embodiment of the present invention for producing a CPVC resin.
Figure 7:
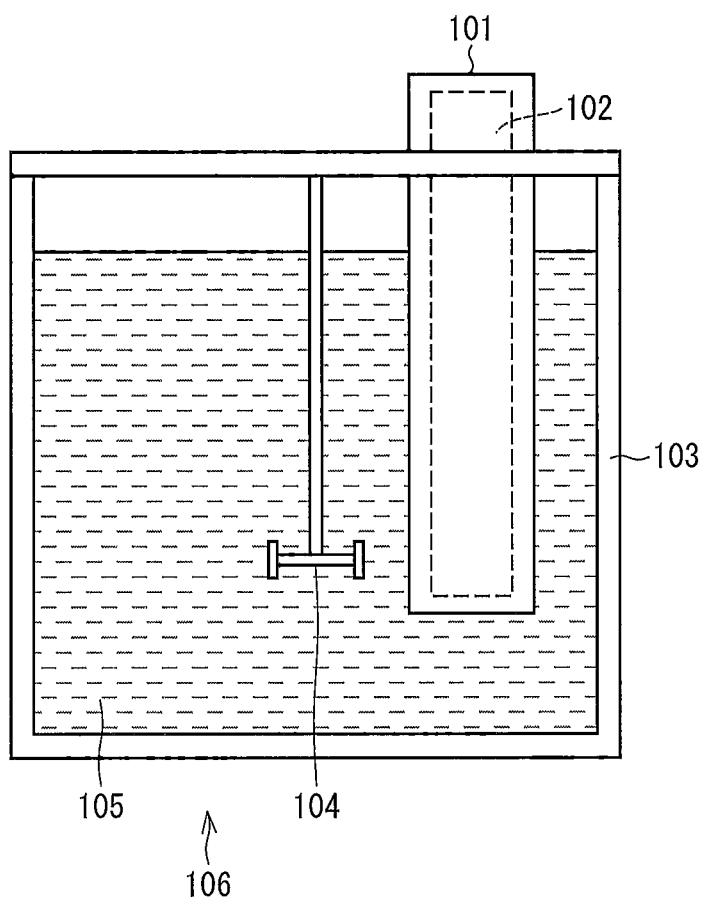
FIG. 7 is a view schematically illustrating a conventional apparatus for producing a CPVC resin.

The following discusses one example of a specific arrangement of a second tank 6" according to the above aspect of the present embodiment, with reference to FIG. 6. The second tank 6" is provided with a UV irradiation panel 20 that has a plurality of UV LED elements 21, and a metal duct 26 where the slurry of the PVC resin is to flow. The metal duct 26 has a transparent window 27. The metal duct 26 having the transparent window 27, as illustrated in FIG. 6, makes it possible to carry out UV irradiation via the transparent window 27 to the slurry 12 having flown into the metal duct 26 via the slurry inlet 23. This makes it possible to carry out a chlorination reaction. Note that though just for convenience of explanation, the UV irradiation panel 20 and the transparent window 27 of the metal duct 26 do not face each other in FIG. 6, the UV irradiation panel 20 and the transparent window 27 of the metal duct 26 are provided so as to face each other in practice. Further, a plurality of UV irradiation panels 20 may be provided so that UV irradiation can be efficiently carried out with respect to the transparent window 27.

Furthermore, a static mixer may be provided inside the metal duct 26. In this case, while the slurry in the metal duct 26 is being stirred, UV irradiation can be carried out. This makes it possible to efficiently carry out a chlorination reaction.

In the above arrangement where a light source for UV irradiation is provided externally to the second tank (outside the second tank), for example, a UV LED can be easily cooled in a case where the UV LED is used as the light source. Further, maintenance such as maintenance inspection and the like of the UV LED becomes easy. This makes it possible to use equipment for a long term.

The light source is not specifically limited as long as the light source is capable of carrying out UV irradiation. However, the inventors of the present invention found out that as to a CPVC resin obtained as a result of chlorination of a PVC resin by UV irradiation to the PVC resin and chlorine by use of at least one kind of light source selected from the group consisting of a UV LED, an organic EL, an inorganic EL and a UV laser, more preferably by use of a UV LED, prevention of initial coloration at the time of hot forming and/or improvement in thermal stability of the CPVC resin can be achieved. Thereby, the inventors of the present invention have accomplished a preferred embodiment of the present invention. Further, in a case where a stirring ability in a reactor vessel is identical and/or an area subjected to irradiation by the light source on a PVC resin is identical, it is preferable to carry out UV irradiation by use of at least one kind of light source selected from the group consisting of a UV LED, an organic EL, an inorganic EL and a UV laser. This is because, by such UV irradiation, a total electric power consumption becomes smaller in the step of chlorinating the PVC resin and this consequently reduces production cost. As another alternative or additional effect of the use at least one kind of light source selected from the group consisting of a UV LED, an organic EL, an inorganic EL and a UV laser, and particularly the use of a UV LED, deterioration in light intensity due to long-term use is suppressed as compared to a case where a mercury lamp is used, and this reduces the number of times of renewal of the light source. As a result, productivity of the CPVC resin is improved. Therefore, the use of such a kind of light source is preferable. As another alternative or additional effect of the use of at least one kind of light source selected from the group consisting of a UV LED, an organic EL, an inorganic EL and a UV laser, if the total electric power consumption is identical, a reaction time becomes shorter as compared to a case where a mercury lamp is used. Therefore, the use of such a kind of light source is preferable. In the present invention, the total electric power consumption is calculated by Formula (1) below, where: a current value of the light source is I(A); a voltage value of the light source is V(V); and a chlorination reaction time is t(h).

$$\text{Total Electric Power Consumption}(W \cdot h) = I \times V \times t \times (\text{number of light sources}) \quad (1)$$

The UV LED only needs to be an LED that is capable of emitting UV light, and not specifically limited. Examples of the UV LED encompasses a semiconductor light-emitting element in which a nitride semiconductor material such as MN, AlGaN, or AlInGaN is used for a light emitting layer or a semiconductor light-emitting element in which a diamond thin film is used for a light emitting layer. It is preferable to use a UV LED that has one peak wavelength. Further, a peak wavelength of UV light emitted from a UV LED can be controlled by a proportion of constituents of a light emitting layer. For example, in a case where a nitride semiconductor material is used for the light emitting layer of the UV LED, a peak wavelength of UV light becomes shorter as the content of Al increases. For UV irradiation, it is also possible to use an organic EL, an inorganic EL, a UV laser each capable of emitting UV light, other than the UV LED. Among these, it is preferable to use a UV LED as the light source. Further, it is preferable that a light source such as an organic EL, an inorganic EL, or a UV laser emits UV light having a peak wavelength and/or a wavelength range similar to that/those of the UV light of emitted by the UV LED. The peak wavelength and the wavelength range of the UV light emitted by the UV LED is as discussed later.

In view of prevention of initial coloration at the time of hot forming and improvement in thermal stability, the peak wavelength of the UV light emitted by the UV LED is preferably in a range of 290 nm to 400 nm.

The wavelength of the UV light emitted by the UV LED is preferably in a range of 260 nm to 430 nm.

Furthermore, in view of thermal stability, it is preferable to use a UV LED that emits UV light whose wavelength range is 300 nm to 430 nm and whose peak wavelength is in a range of 350 nm to 400 nm.

In the present invention, chlorination reaction efficiency can be evaluated by a required total light intensity and/or a reaction time in the case of producing a CPVC resins having the same chlorine content with use of PVC resins having an identical composition. In this evaluation, a smaller required total light intensity means higher chlorination reaction efficiency. Moreover, a shorter reaction time means higher chlorination reaction efficiency. In the present invention, the "total light intensity" is measured and calculated as follows. That is, first, a sensor (manufactured by TOPCON TECHNOHOUSE CORPORATION, product number: UD-36) is mounted on a radiometer (manufactured by TOPCON TECHNOHOUSE CORPORATION, product number: UVR-2). Then, a light intensity per unit area of UV light in irradiation from a light source is measured at a position where a distance between the light source and a PVC resin present in a reactor vessel is the shortest at the time when a chlorination reaction is carried out. Further, an irradiation area where UV light in irradiation from the light source hits the PVC resin is measured at the position where the distance between the light source and the PVC resin present in the reactor vessel is the shortest at the time when the chlorination reaction is carried out. The total light intensity is defined as a value obtained by multiplying a value of the irradiation area obtained by the above measurement by a value of the light intensity per unit area which values are obtained by the above measurement. For example, in a case where the second tank 6 as illustrated in FIGS. 4 to 6 is used for production of a CPVC resin, a light intensity per unit area and an irradiation area should be measured at any position on an inner wall of the transparent duct 22, the transparent duct 25, or the metal duct 26 (transparent window). Alternatively, the light intensity per unit area and the irradiation area may be measured at any position on an outer wall of the transparent duct 22, the transparent duct 25, or the metal duct 26 (transparent window) which outer wall is irradiated with UV light by use of UV LEDs. Note that the measurement of the light intensity per unit area and the irradiation area is to be carried out in the air atmosphere and in a state where the transparent duct or the metal duct is empty.

The number of UV LED(s) used for chlorination of a PVC resin may be one or more. In a case where a plurality of UV LEDs are used, it is possible to use a combination of UV LEDs having the same peak wavelength of UV light in irradiation or a combination of a plurality of UV LEDs respectively having different peak wavelengths of UV light in irradiation. Here, the term "UV LED" indicates both a UV LED element and a UV LED light source device including a plurality of UV LED elements.

In the present invention, the slurry of the PVC resin can be obtained by suspending a PVC resin in an aqueous medium. For example, an aqueous slurry of a PVC resin can be obtained, by using water as the aqueous medium and mixing the PVC resin with water.

The PVC resin used as a material of the CPVC resin can be a homopolymer of vinyl chloride monomers, or a copolymer of a vinyl chloride monomer and another copolymerizable monomer. The another copolymerizable monomer is not specifically limited, but can be, for example, ethylene, propylene, vinyl acetate, allyl chloride, allylglycidylether, acrylic ester, or vinyl ether.

In simple polymerization of vinyl chloride monomers, or copolymerization of a vinyl chloride monomer and another copolymerizable monomer, a dispersant, an oil-soluble polymerization initiator, and the like are used. Note that in the above polymerization, it is possible to further use any of a modifier, a chain transfer agent, a pH adjuster, an antistatic agent, a cross-linking agent, a stabilizer, a filler, an oxidation inhibitor, a scale inhibitor, and the like.

Examples of the dispersant employed here are partially saponified polyvinyl acetate, methyl cellulose, and hydroxypropyl methylcellulose. Examples of the oil-soluble polymerization initiator employed here are lauroyl peroxide, di-2-ethylhexyl peroxy neodecanoate, t-butyl peroxy neodecanoate, and α,α'-azobis-2,4-dimethyl valeronitrile.

The PVC resin is not specifically limited. However, an average particle diameter of the PVC resin is preferably in a range of 0.1 μm to 350 μm, and more preferably in a range of 80 μm to 200 μm. In the present invention, the average particle diameter of the PVC resin is measured in accordance with JIS K0069.

In the present invention, UV irradiation is carried out by the light source provided to the second tank. The start of this UV irradiation initiates a chlorination reaction of the PVC resin.

The PVC resin in the aqueous slurry is chlorinated until the chlorine content reaches a desired content. The chlorination reaction is terminated by ending the UV irradiation. After the chlorination reaction is terminated, unreacted chlorine in the CPVC resin is expelled with use of nitrogen or the like. Then, with use of a warm water whose temperature is Tg (glass transition temperature) or lower of the CPVC resin, residual chlorine in the CPVC resin is removed. Thereafter, dehydration and drying are carried out. As a result, the CPVC resin is obtained.

In view of productivity, stability in viscosity of the aqueous slurry, and uniform mixability of the aqueous slurry at stirring, a concentration of the PVC resin in the aqueous slurry is preferably in a range of 10% by weight to 40% by weight, and more preferably, in a range of 20% by weight to 35% by weight.

In a case where chlorine is to be supplied to the first tank, chlorine may be in either a gaseous state or a liquid state. However, in view of easy handling, chlorine is supplied preferably in a gaseous state. A method of supplying chlorine is not specifically limited, as long as chlorine can be supplied into the aqueous slurry by the method. Examples of the method of supplying chlorine encompass a method of supplying chlorine initially at one time in advance of initialization of the chlorination reaction, a method of intermittently supplying chlorine during the chlorination reaction, and a method of continuously supplying chlorine during the chlorination reaction. As described above, the chlorination reaction is initiated by starting UV irradiation and terminated by ending the UV irradiation in the present invention.

The highest reaction temperature in the chlorination reaction is not specifically limited, but preferably 90° C. or lower, more preferably 88° C. or lower, and most preferably 86° C. or lower. When the highest reaction temperature is 90° C. or lower, deterioration of the PVC resin is prevented and coloring of a resultant CPVC resin is also prevented. In view of making the flow of the aqueous slurry by use of a stirring blade easier, the lowest reaction temperature in the chlorination reaction is preferably above 0° C. Further, in view of shortening a reaction time, the lowest reaction temperature is preferably 30° C. or higher and more preferably 50° C. or higher.

As described above, in the second tank, the slurry of PVC resin into which chlorine has been introduced is irradiated with UV light by use of at least one kind of light source selected from the group consisting of a UV LED, an organic EL, an inorganic EL and a UV laser. Then, in regard to the CPVC resin obtained by chlorination of the PVC resin, it is possible to achieve at least either prevention of initial coloration at the time of hot forming or improvement in thermal stability. Preferably, both prevention of initial coloration at the time of hot forming and improvement of thermal stability of the CPVC resin are achieved.

In the present invention, the initial coloration at the time of hot forming of the CPVC resin is evaluated by measuring a Yellowness index in accordance with JIS K7373, with use of a sample prepared by hot forming of the CPVC resin. A lower value of the Yellowness index indicates better prevention of initial coloration at the time of hot forming. In other words, a lower value of the Yellowness index indicates that initial colorability at the time of hot forming is more excellent. Further, thermal stability of the CPVC resin is evaluated by measurement with use of a sample (sheet) prepared by using the CPVC resin. In this measurement, the sample is heated in an oven at 200° C. and a period of time that elapses before the sheet blackens, that is, a period of time that elapses before an L-value (lightness) of the sheet becomes 20 or less is measured. A longer period of time that elapses before the sheet blackens indicates a higher thermal stability. Further, heat resistance of the CPVC resin is evaluated by measuring the Vicat softening temperature by B50 method in accordance with JIS K7206. A higher Vicat softening temperature indicates a higher heat resistance.

In addition, the present invention encompasses the following inventions.

(1) A method for producing a CPVC resin, the method including the steps of: introducing chlorine into a slurry of a PVC resin in a first tank; transferring, from the first tank to a second tank, the slurry into which chlorine has been introduced; and irradiating, with UV light, the slurry in the second tank.

(2) The method as set forth in (1), wherein pressure is applied inside the first tank.

(3) The method as set forth in (2), wherein a pressure inside the first tank is in a range of 0.02 MPa to 2 MPa.

(4) The method as set forth in any one of (1) to (3), further including the step of circulating the slurry having been irradiated with UV light in the second tank to the first tank.

(5) The method as set forth in (4), further including the step of introducing chlorine into the slurry taken out from the second tank.

(6) The method as set forth in (4) or (5), further including the step of introducing the slurry to a gas phase part or a part in the vicinity of a gas-liquid phase boundary in the first tank when the slurry is circulated from the second tank to the first tank.

(7) The method as set forth in any one of (1) to (6), wherein, in the step of irradiating the slurry with UV light, at least one kind of light source selected from the group consisting of a UV LED, an organic EL, an inorganic EL and a UV laser is used for irradiation.

(8) An apparatus for producing a CPVC resin, the apparatus including: a first tank where chlorine is introduced into a slurry of a PVC resin; and a second tank into which the slurry is introduced from the first tank and in which chlorination is carried out, the second tank being provided with a light source for UV irradiation to the slurry.

(9) The apparatus as set forth in (8), further including a pressure applying section applying pressure to the first tank.

(10) The apparatus as set forth in (9), wherein a pressure inside the first tank is set to 0.05 MPa to 2 MPa.

(11) The apparatus as set forth in any one of (8) to (10), further including a circulating section circulating the slurry having been irradiated with UV light in the second tank to the first tank.

(12) Claim 12

The apparatus as set forth in (11), further including a second chlorine introducing section introducing chlorine into the slurry taken out from the second tank.

(13) The apparatus as set forth in (11) or (12), wherein the circulating section is configured to introduce the slurry to a gas phase part or a part in the vicinity of a gas-liquid phase boundary in the first tank.

(14) The apparatus as set forth in any one of (8) to (13), wherein the light source is at least one kind of light source selected from the group consisting of a UV LED, an organic EL, an inorganic EL and a UV laser.

The present invention is not limited to the description of the embodiments above, but may be altered by a skilled person within the scope of the claims. An embodiment based on a proper combination of technical means disclosed in different embodiments is encompassed in the technical scope of the present invention. The following provides Reference Examples and Examples and explains the present invention in more detail. However, the present invention is by no means limited to such Reference Examples and Examples.

EXAMPLES

Reference Examples

Here, the following Reference Examples show effects of a case where, at least one light source selected from the group consisting of a UV LED, an organic EL, an inorganic EL and a UV laser, more specifically, a UV light source is used, in place of a mercury lamp, as the light source, that is, effects of a case where a UV LED is used as the light source. In the following Reference Examples and Comparative Examples, "part(s)" and "%" is based on weight unless specifically noted otherwise.

Reference Example 1

Preparation of CPVC Resin

Figure 8:
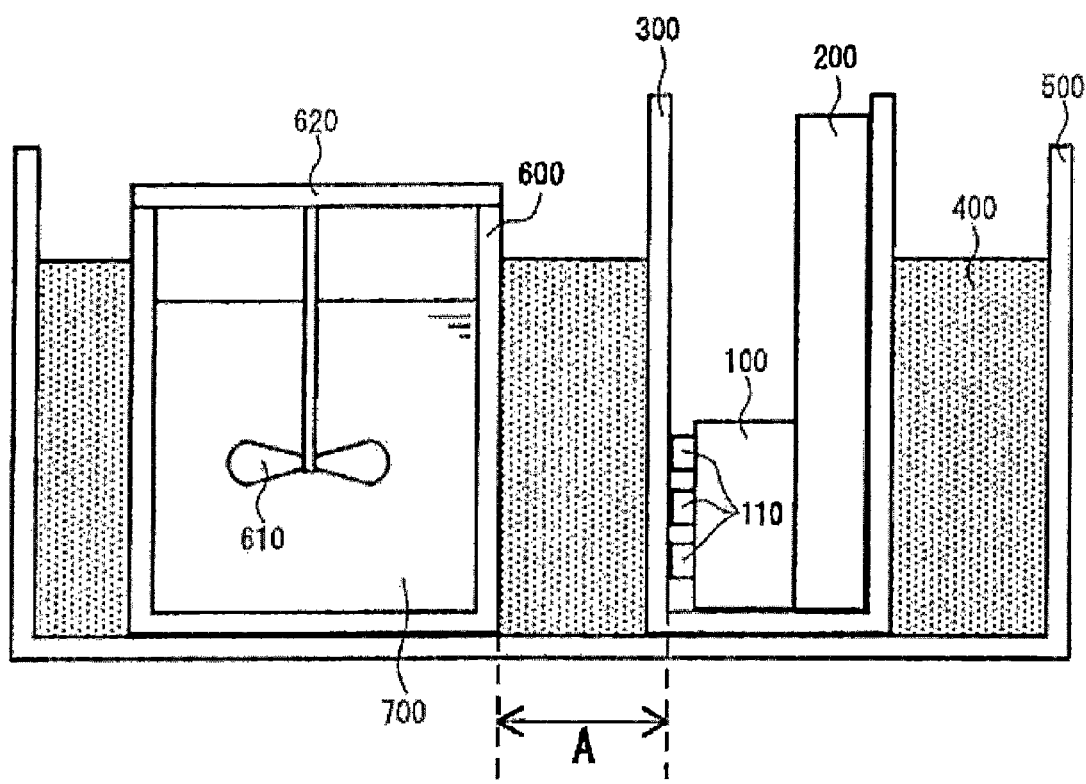
FIG. 8 is a schematic lateral cross-sectional view illustrating an apparatus for producing a CPVC resin, which apparatus includes a UV LED light source device and a reactor vessel that are used in Reference Example 1.

As illustrated in FIG. 8, a UV-LED light source unit (manufactured by Sentec Corporation Ltd., product number: OX223) was prepared as a UV LED light source device 100. The UV LED light source device 100 has three UV LED elements 110 (manufactured by Nichia Corporation, product number: NC4U133, forward current: 500 mA, forward voltage: 14.9 V) each having a peak wavelength of 365 nm.

Figure 9:
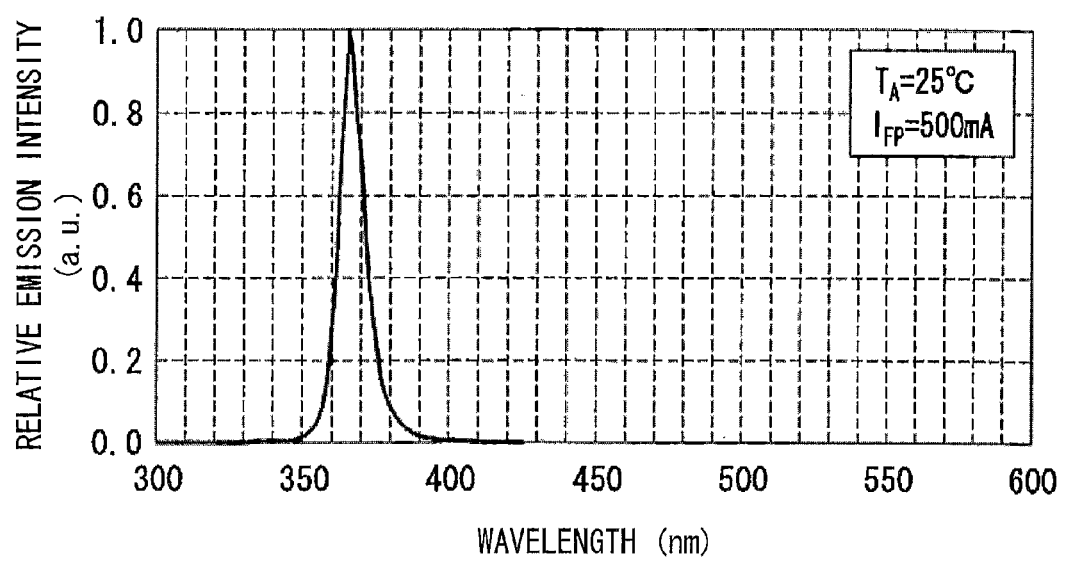
FIG. 9 is a view showing an emission spectrum of one example of a UV LED that is used in Reference Examples.

An emission spectrum of the UV LED elements used in Reference Example 1 is as illustrated in FIG. 9. As illustrated in FIG. 9, the UV light emitted for irradiation by the UV LED elements 110 had a wavelength range of 350 nm to 392 nm and also had one peak whose wavelength was 365 nm. Here, as described above, the wavelength range means a range of wavelengths in the emission spectrum which wavelengths have a relative emission intensity that is higher by 2% or more relative to a relative emission intensity at the peak wavelength.

After placed on an aluminum support 200 (length: 20 mm, width: 20 mm, and height 300 mm), the UV LED light source device 100 was put in a transparent glass cylindrical container 300 (PYREX (registered trademark)) (inner diameter: 75 mm, height: 400 mm, and thickness: 2.5 mm).

In a water bath 500 in which warm water 400 at 60° C. was provided, the UV LED light source device 100 put in the cylindrical container 300 and a reactor vessel 600 (capacity: 3 L, PYREX (registered trademark)) were placed. The reactor vessel 600 was a transparent glass container having a thickness of 3.6 mm. More specifically, the UV LED light source device 100 placed in the water bath 500 was arranged so that the UV LED light source device 100 faced the reactor vessel 600 and the three UV LED elements 110 were aligned at equal intervals of 15 mm in a line in a height direction. At this time, a distance A between the reactor vessel 600 and the UV LED elements 110 was arranged to be 80 mm. Note that in the water bath 500, a heat source (not illustrated) for keeping the temperature of the warm water 400 at a predetermined temperature was provided.

Next, into the reactor vessel 600, 1.8 kg of pure water and 0.2 kg of a PVC resin (manufactured by Kaneka Corporation) were supplied. The PVC resin had a K-value of 66.7, an average particle diameter of 170 µm, and an apparent density of 0.568 g/ml. Then, the inside of the reactor vessel 600 was sealed with a cover 620. Note that the K-value of the PVC resin is a value obtained in accordance with JIS-K7367-2, the average particle diameter is a value obtained in accordance with JIS-K0069, and the apparent density is a value obtained in accordance with JIS-K7365 (the same applies to values described below). Then, an aqueous slurry 700 of the PVC resin, that is, a mixture solution of pure water and the PVC resin was stirred at a rotational frequency of 340 rpm, by use of a turbine blade 610 of the reactor vessel 600.

Then, vacuum degassing and nitrogen replacement in the reactor vessel 600 was carried out. Next, chlorine gas was blown into the aqueous slurry 700 of the PVC resin. Simultaneously, while the aqueous slurry 700 of the PVC resin was being stirred by the turbine blade 610, UV irradiation from the UV LED elements 110 was carried out with respect to the aqueous slurry 700 of the PVC resin, so that a chlorination reaction was initiated. Note that chlorine gas was blown in carefully so that a pressure in the reactor vessel 600 was not reduced. During the chlorination reaction, the temperature of the warm water 400 in the water bath 500 was kept at 60° C.

When the chlorine content of the CPVC resin had reached 66.3%, UV irradiation by use of the UV LED elements 110 was ended. Thereby, the chlorination reaction was terminated. The chlorine content of the CPVC resin was calculated by a value of neutralization titration of chloric acid that was a by-product of the chlorination reaction (the same applies to values described below). A chlorination reaction time was defined as a time required until the chlorine content of the CPVC resin reached 66.3%, that is, a time from the start to the end of UV irradiation. This reaction time was 96 minutes. Then, after unreacted chlorine in the CPVC resin was expelled with use of nitrogen gas, residual hydrochloric acid was removed by washing with water and thereafter, the CPVC resin was dried. Thereby, the CPVC resin was obtained.

Comparative Example 1

Except that one 100 W high-pressure mercury vapor lamp (manufactured by Toshiba Light & Technology Corporation, current value 1.3 A, voltage value 100 V) was used in place of one UV LED light source device 100 supported by the support 200, a CPVC resin was obtained as in Reference Example 1.

In Comparative Example 1, a chlorination reaction time that was a time required until the chlorine content of the CPVC resin reached 66.3%, that is, a time from the start to the end of UV irradiation was 120 minutes.

Initial coloration at the time of hot forming and thermal stability of the CPVC resins obtained in Reference Example 1 and Comparative Example 1 were measured and evaluated as follows. Further, by measuring and evaluating as follows the Vicat softening temperature, heat resistance was measured and evaluated.

<Initial Coloration at Hot Forming>

To 100 parts by weight of each of the CPVC resins, 10 parts by weight of methyl methacrylate butadiene styrene (MBS) resin (manufactured by Kaneka Corporation, product number: Kaneace (registered trademark) B31), 1 part by weight of liquid tin stabilizer (manufactured by Nitto Kasei Co., Ltd., product number: TVS#8831), 1 part by weight of powder tin stabilizer (manufactured by Nitto Kasei Co., Ltd., product number: TVS#8813), 1 part by weight of stearic acid (manufactured by Kao Corporation, product number: Lunac (registered trademark) S-90V) that is a lubricant, and 0.3 part by weigh of polyethylene wax (Mitsui Chemicals Inc., product number: Hiwax220MP) were blended. Then, a resultant blend was kneaded at 195° C. for 5 minutes with use of an 8-inch roll, so that a 0.6-mm-thick sheet was prepared.

After fifteen of thus obtained sheets were laminated and sandwiched between mirror-finished ferrotype plates that were made of chrome-plated steel plates, thus laminated sheets were pressed for 10 minutes at 200° C. and at a pressure adjusted in a range of 3 MPa to 5 MPa. Thereby, a 5-mm-thick plate was prepared. Yellowness index (hereinafter, also referred to as "YI") of thus obtained plate was measured in accordance with JIS-K7373 by use of a colorimeter (manufactured by Nipppon Denshoku Industries Co., Ltd., product number: ZE-2000).

<Thermal Stability>

To 100 parts by weight of each of the CPVC resins, 10 parts by weight of methyl methacrylate butadiene styrene (MBS) resin (manufactured by Kaneka Corporation, product number: Kaneace (Registered Trademark) B31), 1 part by weight of liquid tin stabilizer (manufactured by Nitto Kasei Co., Ltd., product number: TVS#8831), 1 part by weight of powder tin stabilizer (manufactured by Nitto Kasei Co., Ltd., product number: TVS#8813), 1 part by weight of stearic acid (manufactured by Kao Corporation, product number: Lunac (registered trademark) S-90V) that is a lubricant, and 0.3 part by weigh of polyethylene wax (Mitsui Chemicals Inc., product number: Hiwax220MP) were blended. Then, a resultant blend was kneaded at 195° C. for 5 minutes with use of an 8-inch roll, so that a 0.6-mm-thick sheet was prepared.

Thus obtained sheet was cut into a piece measuring 3 cm in length and 5 cm in width. Then, this piece was heated in an oven at 200° C. and a time that had elapsed before the sheet blackened was measured. To "blacken" means that an L-value of the sheet becomes 20 or less. The L-value was measured by use of a colorimeter (Manufactured by Nipppon Denshoku Industries Co., Ltd., product number: ZE-2000).

<Vicat Softening Temperature>

To 100 parts by weight of each of the CPVC resins, 10 parts by weight of methyl methacrylate butadiene styrene (MBS) resin (manufactured by Kaneka Corporation, product number: Kaneace (Registered Trademark) B31), 1 part by weight of liquid tin stabilizer (manufactured by Nitto Kasei Co., Ltd., product number: TVS#8831), 1 part by weight of powder tin stabilizer (manufactured by Nitto Kasei Co., Ltd., product number: TVS#8813), 1 part by weight of stearic acid (manufactured by Kao Corporation, product number: Lunac (registered trademark) S-90V) that is a lubricant, and 0.3 part by weigh of polyethylene wax (Mitsui Chemicals Inc., product number: Hiwax220MP) were blended. Then, a resultant blend was kneaded at 195° C. for 5 minutes with use of an 8-inch roll, so that a 0.6-mm-thick sheet was prepared.

After fifteen of thus obtained sheets were laminated and sandwiched between mirror-finished ferrotype plates that were made of chrome-plated steel plates, thus laminated sheets were pressed for 10 minutes at 200° C. and at a pressure adjusted in a range of 3 MPa to 5 MPa. Thereby, a 5-mm-thick plate was prepared. By using thus obtained plate, the Vicat softening temperature of the CPVC resin was measured in accordance with JIS-K7206. Note that a load was set to 5 kg while a rate of temperature rise was set to 50° C./h (B50 method).

As a result of the above measurements, as to the CPVC resin obtained in Reference Example 1, the YI was 136, the time required for blackening was 40 minutes, and the Vicat softening temperature was 112.3° C. On the other hand, as to the CPVC resin obtained in Comparative Example 1, the YI was 142, the time required for blackening was 30 minutes, and the Vicat softening temperature was 111.6° C. These results were shown together in Table 1 below.

TABLE 1

| | | Reference Example 1 | Comparative Example 1 |
|---|---|---|---|
| Experimental Conditions | Light Source | UV LED | Mercury Lamp |
| | Peak Wavelength (nm) | 365 | — |
| | Number of LED Elements | 3 | — |
| | Chlorination Reaction Time (min) | 96 | 120 |
| | Total Electric Power Consumption (W · h) | 35.8 | 260 |
| CPVC Resin | Chlorine Content (%) | 66.3 | 66.3 |
| | Initial Coloration (YI) at Hot Forming | 136 | 142 |
| | Thermal Stability (min) | 40 | 30 |
| | Vicat Softening Temperature (° C.) | 112.3 | 111.6 |

As is clear from data in Table 1 above, the CPVC resin obtained in Reference Example 1 had a lower YI and therefore, a better initial colorability at the time of hot forming, as compared to the CPVC resin obtained in Comparative Example 1. Moreover, the CPVC resin obtained in Reference Example 1 required a longer time for blackening, and therefore, had a better thermal stability, as compared to the CPVC resin obtained in Comparative Example 1. Further, the CPVC resin obtained in Reference Example 1 had a higher Vicat softening temperature and therefore had a better heat resistance, as compared to the CPVC resin obtained in Comparative Example 1. When CPVC resins having substantially equal chlorine contents were to be produced, a total electric power consumption required for a chlorination reaction was much lower in Reference Example 1 in which UV irradiation was carried out by use of a UV LED, as compared to Comparative Example 1 in which UV irradiation was carried out by use of a mercury lamp. This means that an energy saving effect was obtained and therefore, cost was reduced in Reference Example 1.

Reference Example 2

Preparation of CPVC Resin

Figure 10:
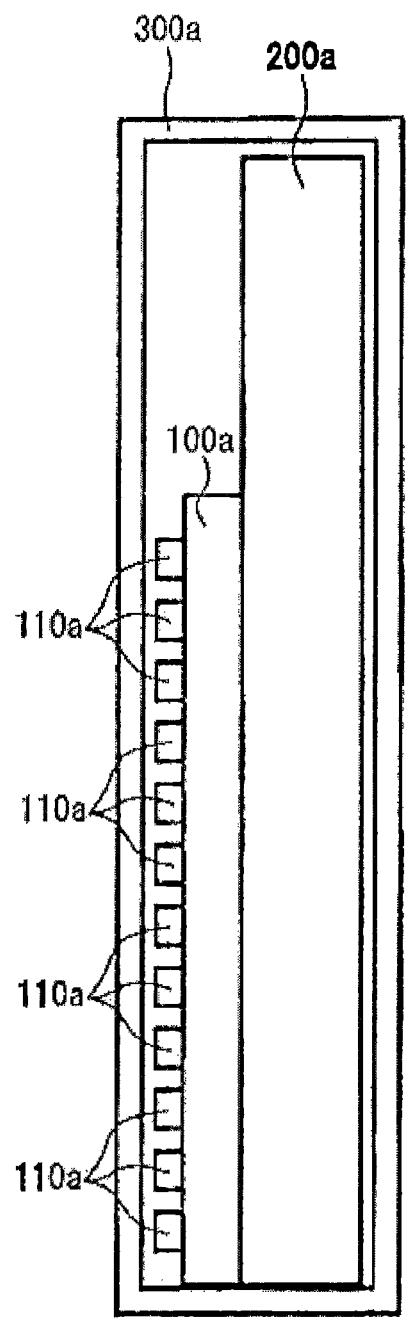
FIG. 10 is a schematic lateral cross-sectional view illustrating a UV LED light source device used in Reference Example 2.

As illustrated in FIG. 10, a UV-LED light source unit (manufactured by Sentec Corporation Ltd., product number: OX224) was prepared as a UV LED light source device 100a.

The UV LED light source device 100a has twelve UV LED elements 110a (manufactured by Nichia Corporation, product number: NC4U133, forward current: 500 mA, forward voltage: 14.9 V) that emits UV light for irradiation having a peak wavelength of 365 nm. Note that an emission spectrum of the UV LED elements used in Reference Example 2 is as illustrated in FIG. 9.

After the UV LED light source device 100a was placed on a support 200a as illustrated in FIG. 10 so as to be supported by the support 200a, this UV LED light source device 100a was put in a transparent glass cylindrical container 300a (PYREX (registered trademark)) (inner diameter: 74 mm, height: 600 mm, and thickness: 7 mm).

Figure 11:
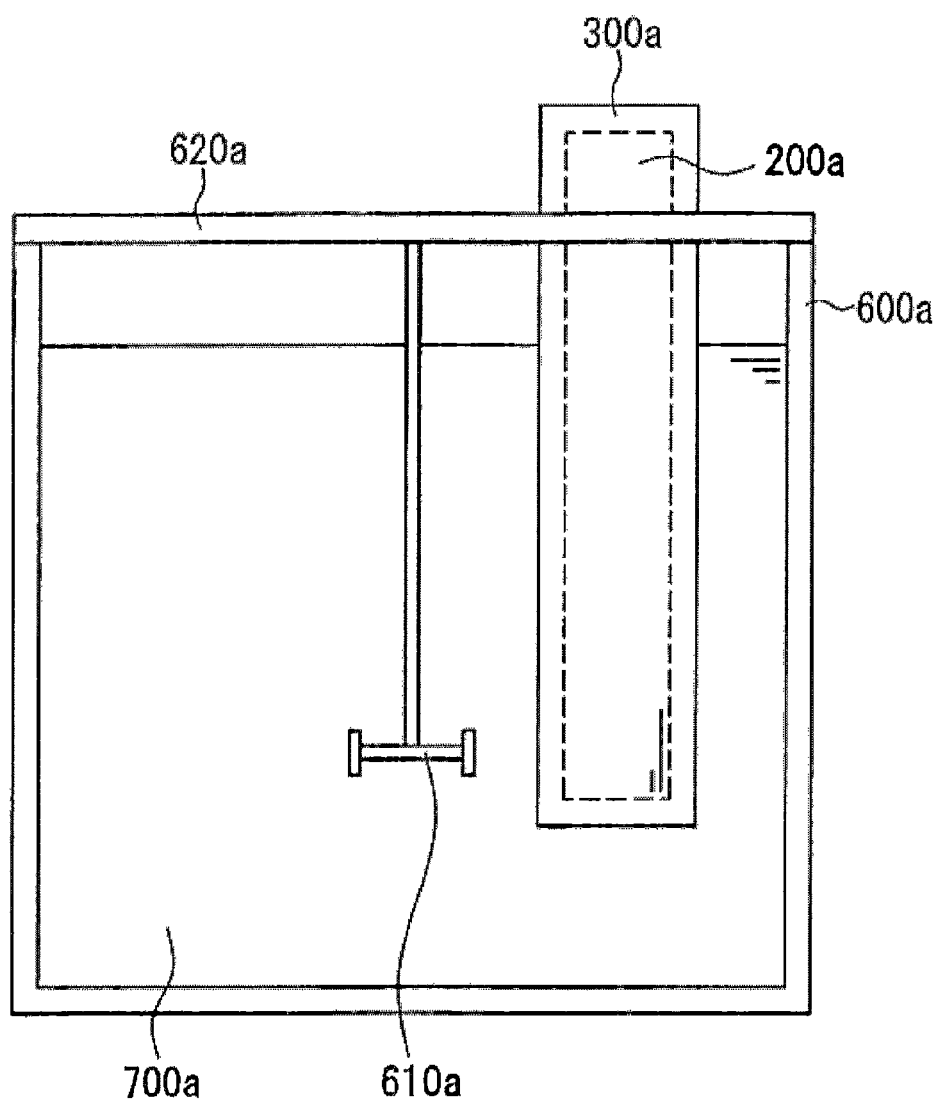
FIG. 11 is a schematic lateral cross-sectional view illustrating an apparatus for producing a CPVC resin, which apparatus includes a UV LED light source device and a reactor vessel that are used in Reference Example 2.
Figure 12:
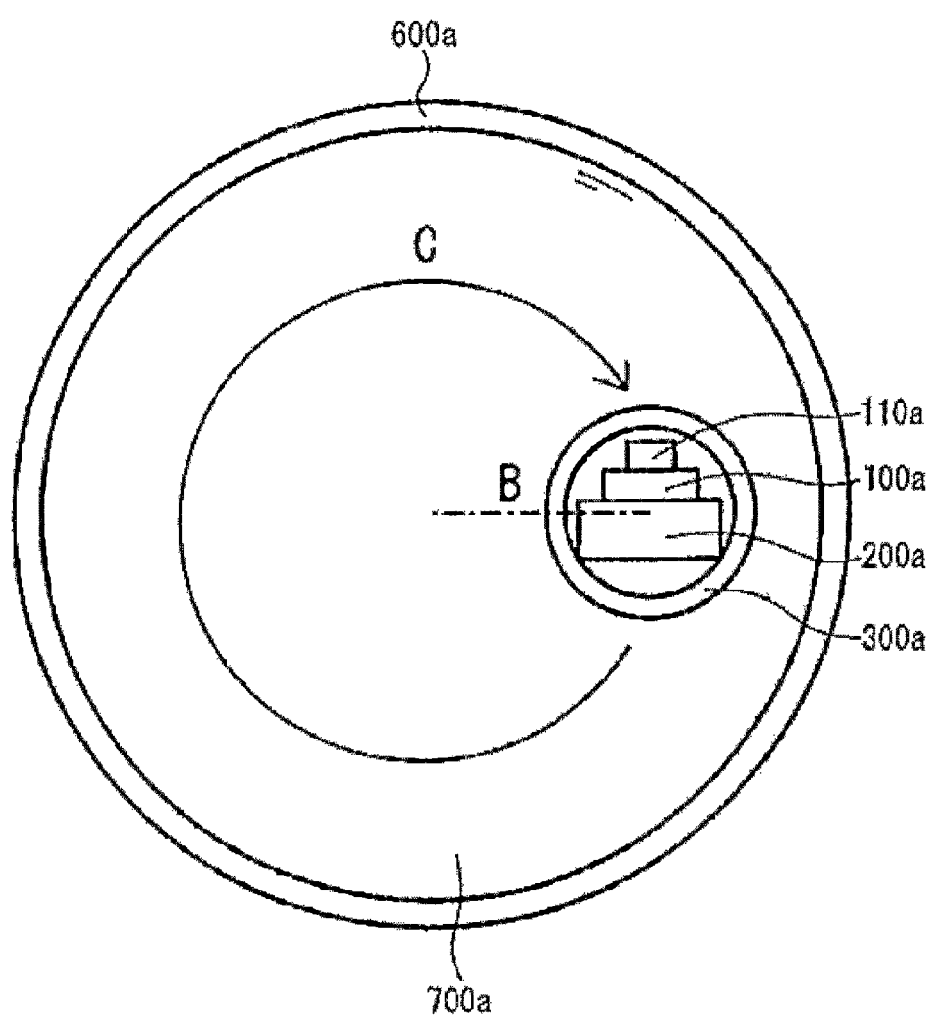
FIG. 12 is a schematic top view illustrating an apparatus for producing a CPVC, which apparatus includes a UV LED light source device and a reactor vessel that are used in Reference Example 2.

Then, as illustrated in FIGS. 11 and 12, one UV LED light source device 100a put in the cylindrical container 300a was placed in a reactor vessel 600a (capacity: 100 L) with a jacket. More specifically, the UV LED light source device 100a was placed so that a distance between a center of the reactor vessel 600a that is cylindrical and a center of the cylindrical container 300a, that is, a length B indicated by dashed-dotted line in FIG. 12 was 210 mm. At this time, the twelve UV LED elements 110a were aligned at intervals of 15 mm in a line in a height direction. Moreover, the UV LED element 110a that was provided at the lowest position was at a position 132 mm apart from a bottom surface of the reactor vessel 600a. Further, the UV LED elements 110a were placed so that a direction of UV irradiation was opposed to a direction of a flow in stirring (direction indicated by an arrow C in FIG. 12).

Next, into the reactor vessel 600a, 45 kg of pure water and 5 kg of a PVC resin (manufactured by Kaneka Corporation) were supplied. The PVC resin had a K-value of 57.1, an average particle diameter of 125 μm, and an apparent density of 0.496 g/ml. Then, the inside of the reactor vessel 600a was sealed with a cover 620a. Then, an aqueous slurry 700a of the PVC resin, that is, a mixture solution of pure water and the PVC resin was stirred at a rotational frequency of 590 rpm, by use of a turbine blade 610a (diameter: 180 mm) of the reactor vessel 600a.

Then, vacuum degassing and nitrogen replacement in the reactor vessel 600a was carried out, and thereafter, vacuum degassing was carried out again. Next, chlorine gas was blown into the aqueous slurry 700a of the PVC resin. Simultaneously, while the aqueous slurry 700a of the PVC resin was being stirred by the turbine blade 610a, UV irradiation from the UV LED elements 110a was carried out with respect to the aqueous slurry 700a of the PVC resin, so that a chlorination reaction was initiated. The temperature inside the reactor vessel 600a was raised to 50° C. over 25 minutes after initiation of the nitrogen replacement, and then cooled down to 40° C. over 15 minutes from initiation of the chlorination reaction (the start of UV irradiation). Thereafter, during the chlorination reaction (during UV light irradiation), the temperature was kept at 40° C.

When the chlorine content of the CPVC resin had reached 64.4%, UV irradiation by use of the UV LED elements 110a was ended. A chlorination reaction time was defined as a time required until the chlorine content of the CPVC resin reached 64.4%, that is, a time from the start to the end of UV irradiation. This reaction time was 147 minutes. Then, after unreacted chlorine in the CPVC resin was expelled with use of nitrogen gas, residual hydrochloric acid was removed by washing with water and thereafter, the CPVC resin was dried. Thereby, the CPVC resin was obtained.

Comparative Example 2

Except that one 100 W high-pressure mercury vapor lamp (manufactured by Sun-energy Corporation, product number: SEH1002J01, forward current: 1.1±0.1 A, forward voltage: 110±10 V) was used in place of one UV LED light source device 100a supported on the support 200a, a CPVC resin was obtained as in Reference Example 2.

In Comparative Example 2, a chlorination reaction time that was a time required until the chlorine content of the CPVC resin reached 64.4%, that is, a time from the start to the end of UV irradiation was 234 minutes.

Initial coloration at the time of hot forming, thermal stability and heat resistance (Vicat softening temperature) of the CPVC resins obtained in Reference Example 2 and Comparative Example 2 were measured and evaluated as follows.

<Initial Coloration at Hot Forming>

To 100 parts by weight of each of the CPVC resins, 5 parts by weight of methyl methacrylate butadiene styrene (MBS) resin (manufactured by Kaneka Corporation, product number: Kaneace (registered trademark) B11A), 3 parts by weight of liquid tin stabilizer (manufactured by Nitto Kasei Co., Ltd., product number: N2000C), 1 part by weight of PMMA resin (manufactured by Kaneka Corporation, product number: Kaneace (registered trademark) PA-20), and 1 part by weight of composite lubricant (manufactured by Kawaken Fine Chemicals Co., Ltd., product number: VLTN-4) were blended. Then, a resultant blend was kneaded at 180° C. for 3 minutes with use of an 8-inch roll, so that a 0.6-mm-thick sheet was prepared.

After fifteen of thus obtained sheets were laminated and sandwiched between mirror-finished ferrotype plates that were made of chrome-plated steel plates, thus laminated sheets were pressed for 10 minutes at 190° C. and at a pressure adjusted in a range of 3 MPa to 5 MPa. Thereby, a 5-mm-thick plate was prepared. The YI of thus obtained plate was measured in accordance with JIS-K7373 by use of a colorimeter (manufactured by Nipppon Denshoku Industries Co., Ltd., product number: ZE-2000).

<Thermal Stability>

To 100 parts by weight of each of the CPVC resins, 5 parts by weight of methyl methacrylate butadiene styrene (MBS) resin (manufactured by Kaneka Corporation, product number: Kaneace (registered trademark) B11A), 3 parts by weight of liquid tin stabilizer (manufactured by Nitto Kasei Co., Ltd., product number: N2000C), 1 part by weight of PMMA resin (manufactured by Kaneka Corporation, product number: Kaneace (registered trademark) PA-20), and 1 part by weight of composite lubricant manufactured by Kawaken Fine Chemicals Co., Ltd., product number: VLTN-4) were blended. Then, a resultant blend was kneaded at 180° C. for 3 minutes with use of an 8-inch roll, so that a 0.6-mm-thick sheet was prepared. Thus obtained sheet was cut into a piece measuring 3 cm in length and 3.5 cm in width. Then, this piece was heated in an oven at 200° C. and a time that had elapsed before the sheet blackened was measured. To "blacken" means that an L-value of the sheet becomes 20 or less. The L-value was measured by use of a colorimeter (Manufactured by Nipppon Denshoku Industries Co., Ltd., product number: ZE-2000).

<Vicat Softening Temperature>

To 100 parts by weight of each of the CPVC resins, 5 parts by weight of methyl methacrylate butadiene styrene (MBS) resin (manufactured by Kaneka Corporation, product number: Kaneace (registered trademark) B11A), 3 parts by weight of liquid tin stabilizer (manufactured by Nitto Kasei Co., Ltd., product number: N2000C), 1 part by weight of PMMA resin (manufactured by Kaneka Corporation, product number: Kaneace (registered trademark) PA-20), and 1 part by weight of composite lubricant manufactured by Kawaken Fine Chemicals Co., Ltd., product number: VLTN-4) were blended. Then, a resultant blend was kneaded at 180° C. for 3 minutes with use of an 8-inch roll, so that a 0.6-mm-thick sheet was prepared. After fifteen of thus obtained sheets were laminated and sandwiched between mirror-finished ferrotype plates that were made of chrome-plated steel plates, thus laminated sheets were pressed for 10 minutes at 200° C. and at a pressure adjusted in a range of 3 MPa to 5 MPa. Thereby, a 5-mm-thick plate was prepared. By using thus obtained plate, the Vicat softening temperature of the CPVC resin was measured in accordance with JIS-K7206. Note that a load was set to 5 kg while a rate of temperature rise was set to 50° C./h (B50 method).

As a result of the above measurements, as to the CPVC resin obtained in Reference Example 2, the YI was 77.6, the time required for blackening was 80 minutes, and the Vicat softening temperature was 98.6° C. On the other hand, as to the CPVC resin obtained in Comparative Example 2, the YI was 87.1, the time required for blackening was 70 minutes, and the Vicat softening temperature was 97.2° C. These results were shown together in Table 2 below.

TABLE 2

|  |  | Reference Example 2 | Comparative Example 2 |
|---|---|---|---|
| Experimental Conditions | Light Source | UV LED | Mercury Lamp |
|  | Peak Wavelength (nm) | 365 | — |
|  | Number of LED Elements | 12 | — |
|  | Chlorination Reaction Time (min) | 147 | 234 |
|  | Total Electric Power Consumption (W · h) | 219 | 429 |
| CPVC Resin | Chlorine Content (%) | 64.4 | 64.4 |
|  | Initial Coloration (YI) at Hot Forming | 77.6 | 87.1 |
|  | Thermal Stability (min) | 80 | 70 |
|  | Vicat Softening Temperature (° C.) | 98.6 | 97.2 |

As is clear from data in Table 2 above, the CPVC resin obtained in Reference Example 2 had a lower YI and therefore, a better initial colorability at the time of hot forming, as compared to the CPVC resin obtained in Comparative Example 2. Moreover, the CPVC resin obtained in Reference Example 2 required a longer time for blackening, and therefore, had a better thermal stability, as compared to the CPVC resin obtained in Comparative Example 2. Further, the CPVC resin obtained in Reference Example 2 had a higher Vicat softening temperature and therefore had a better heat resistance, as compared to the CPVC resin obtained in Comparative Example 2. When CPVC resins having substantially equal chlorine contents were to be produced, a total electric power consumption required for a chlorination reaction was much lower in Reference Example 2 in which UV irradiation was carried out by use of a UV LED, as compared to Comparative Example 2 in which UV irradiation was carried out by use of a mercury lamp. This means that an energy saving effect was obtained and therefore, cost was reduced in Reference Example 2.

Reference Example 3

Preparation of CPVC Resin

Figure 13:
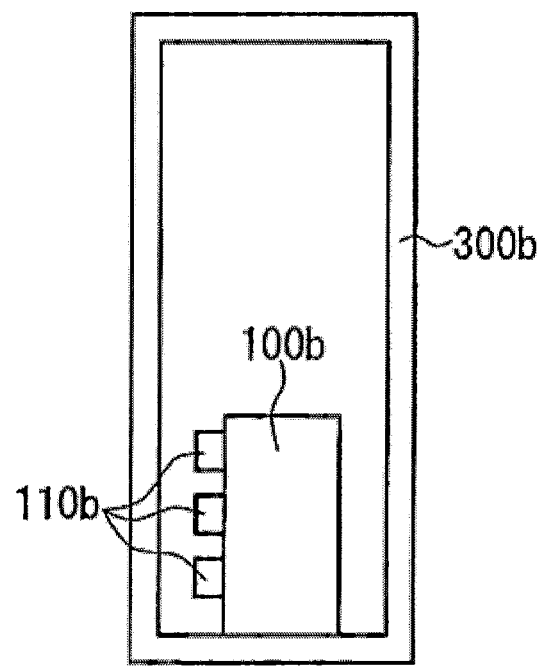
FIG. 13 is a schematic lateral cross-sectional view illustrating a UV LED light source device used in Reference Example 3.

As illustrated in FIG. 13, a UV-LED light source unit (manufactured by Sentec Corporation Ltd., product number: OX558) was prepared as a UV LED light source device 100b. The UV LED light source device 100b has three UV LED elements 110b (manufactured by Nichia Corporation, product number: NC4U133A, forward current: 500 mA, forward voltage: 14.9 V) each having a peak wavelength of 365 nm.

An emission spectrum of the UV LED elements used in Reference Example 3 is as illustrated in FIG. 9. As illustrated in FIG. 9, the UV light emitted for irradiation by the UV LED elements 110b had a wavelength range of 350 nm to 392 nm and also had one peak whose wavelength was 365 nm.

The UV LED light source device 100b was put in a transparent glass cylindrical container 300b (PYREX (registered trademark)) (inner diameter: 25 mm, height: 360 mm, and thickness: 2.5 mm).

Figure 14:
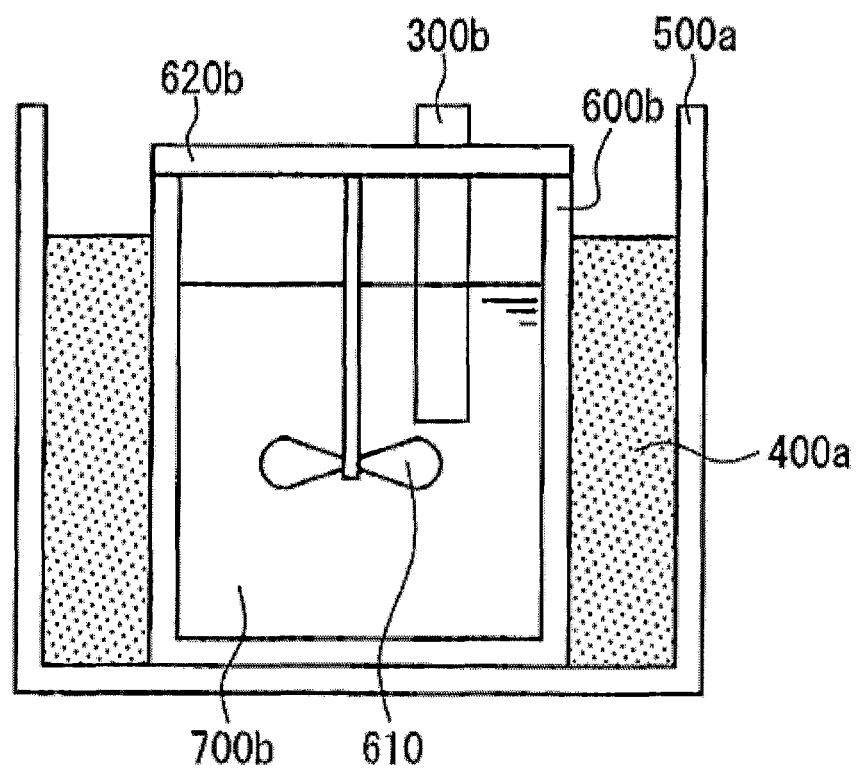
FIG. 14 is a schematic lateral cross-sectional view illustrating an apparatus for producing a CPVC resin, which apparatus includes a UV LED light source device and a reactor vessel that are used in Reference Example 3.

As illustrated in FIG. 14, in a water bath 500a in which warm water 400a at 25° C. was provided, one reactor vessel 600b (capacity: 10 L, PYREX (registered trademark)) that was a transparent glass container was placed. Then, one UV LED light source device 100b put in the cylindrical container 300b was placed in the reactor vessel 600b. At this time, the three UV LED elements 110b were aligned at equal intervals of 15 mm in a line in a height direction. Moreover, the UV LED element 110b that was provided at the lowest position was at a position 90 mm apart from a bottom surface of the reactor vessel 600b. Further, the UV LED elements 110b were placed so that a direction of UV irradiation was opposed to a direction of a flow in stirring. Note that in the water bath 500a, a heat source (not illustrated) for keeping the warm water 400a at a predetermined temperature was provided.

Next, into the reactor vessel 600b, 5.4 kg of pure water and 0.6 kg of a PVC resin (manufactured by Kaneka Corporation) were supplied. The PVC resin had a K-value of 66.7, an average particle diameter of 170 µm, and an apparent density of 0.568 g/ml. Then, the inside of the reactor vessel 600b was sealed with a cover 620b. Then, an aqueous slurry 700b of the PVC resin, that is, a mixture solution of pure water and the PVC resin was stirred at a rotational frequency of 800 rpm, by use of a turbine blade 610 of the reactor vessel 600b.

After vacuum degassing and nitrogen replacement in the reactor vessel 600b was carried out, chlorine gas was blown into the aqueous slurry 700b of the PVC resin. Simultaneously, while the aqueous slurry 700b of the PVC resin was being stirred by the turbine blade 610, UV irradiation from the UV LED elements 110b was carried out with respect to the aqueous slurry 700b of the PVC resin, so that a chlorination reaction was initiated. Note that chlorine gas was blown in carefully so that a pressure in the reactor vessel 600b was not reduced. During the chlorination reaction, the temperature of the warm water 400a in the water bath 500a was kept at 70° C.

When the chlorine content of the CPVC resin had reached 67.1%, UV irradiation by use of the UV LED elements 110b was ended. Thereby, the chlorination reaction was terminated. A chlorination reaction time that was a time required until the chlorine content of the CPVC resin reached 67.1%, that is, a time from the start to the end of UV irradiation was 120 minutes. Then, after unreacted chlorine in the CPVC resin was expelled with use of nitrogen gas, residual hydrochloric acid was removed by washing with water and thereafter, the CPVC resin was dried. Thereby, the CPVC resin was obtained.

Reference Example 4

Except that one UV-LED light source unit (manufactured by Sentec Corporation Ltd., product number: OX559) was used as a UV LED light source device in place of the UV LED light source device 100b, a CPVC resin was obtained as in Reference Example 3. The UV LED light source device used here has three UV LED elements (manufactured by Nichia Corporation, product number: NC4U134A, forward current: 500 mA, forward voltage: 14.8 V) each having a peak wavelength of 385 nm.

An emission spectrum of the UV LED elements used in Reference Example 4 is as illustrated in FIG. 15. As illustrated in FIG. 15, the UV light emitted for irradiation by the UV LED elements had a wavelength range of 355 nm to 415 nm and also had one peak whose wavelength was 385 nm. Here, as described above, the wavelength range means a range of wavelengths in the emission spectrum which wavelengths have a relative emission intensity that is higher by 2% or more relative to a relative emission intensity at the peak wavelength.

In Reference Example 4, a chlorination reaction time that was a time required until the chlorine content of the CPVC resin reached 67.2%, that is, a time from the start to the end of UV irradiation was 135 minutes.

Comparative Example 3

Except that one 100 W high-pressure mercury vapor lamp (manufactured by Toshiba Light & Technology Corporation, current value 1.3 A, voltage value 100 V) was used in place of one UV LED light source device 100b, a CPVC resin was obtained as in Reference Example 3.

In Comparative Example 3, a chlorination reaction time that was a time required until the chlorine content of the CPVC resin reached 67.1%, that is, a time from the start to the end of UV irradiation was 93 minutes.

Initial coloration at the time of hot forming, thermal stability and Vicat softening temperature of the CPVC resins obtained in Reference Examples 3 and 4 and Comparative Example 3 were measured and evaluated as in Reference Example 1.

As a result, as to the CPVC resin obtained in Reference Example 3, the YI was 91.1, the time required for blackening was 60 minutes, and the Vicat softening temperature was 117.8° C. Meanwhile, as to the CPVC resin obtained in Reference Example 4, the YI was 93.3, the time required for blackening was 50 minutes, and the Vicat softening temperature was 115.2° C. On the other hand, as to the CPVC resin obtained in Comparative Example 3, the YI was 132.3, the time required for blackening was 20 minutes, and the Vicat softening temperature was 114.3° C. These results were shown together in Table 3 below.

Further, respective total light intensities in Reference Examples 3 and 4, and Comparative Example 3 were measured and calculated as follows. That is, first, a sensor (manufactured by TOPCON TECHNOHOUSE CORPORATION, product number: UD-36) was mounted on a radiometer (manufactured by TOPCON TECHNOHOUSE CORPORATION, product number: UVR-2). Then, a light intensity per unit area of UV light in irradiation from the light source was measured at a position where a distance between the light source and the PVC resin present in the reactor vessel was the shortest at the time when the chlorination reaction was carried out. Further, an irradiation area where UV light in irradiation from the light source hits the PVC resin was measured at the position where the distance between the light source and the PVC resin present in the reactor vessel was the shortest at the time when the chlorination reaction was carried out. The total light intensities each were defined as a value obtained by multiplying a value of the irradiation area obtained by the above measurement by a value of the light intensity per unit area. Note that in the above measurement, the light intensity per unit area and the irradiation area were measured in the air atmosphere and in a state where the reactor vessel was empty. Results of the above measurement and calculation were shown in Table 3 below.

TABLE 3

| | | Reference Example 3 | Reference Example 4 | Comparative Example 3 |
|---|---|---|---|---|
| Experimental Conditions | Light Source | UV LED | | Mercury Lamp |
| | Peak Wavelength (nm) | 365 | 385 | — |
| | Number of LED Elements | 3 | 3 | — |
| | Chlorination Reaction Time (min) | 120 | 135 | 93 |
| | Total Light Intensity (mW) | 2569 | 3049 | 2798 |
| | Total Electric Power Consumption (W · h) | 44.7 | 50.0 | 201.5 |
| CPVC Resin | Chlorine Content (%) | 67.1 | 67.2 | 67.1 |
| | Initial Coloration (YI) At Hot Forming | 91.1 | 93.3 | 132.3 |
| | Thermal Stability (min) | 60 | 50 | 20 |
| | Vicat Softening Temperature (° C.) | 117.8 | 115.2 | 114.3 |

As is clear from data in Table 3 above, the CPVC resins obtained in Reference Examples 3 and 4 each had a lower YI-value and therefore, a better initial colorability at the time of hot forming, as compared to the CPVC resin obtained in Comparative Example 3. Moreover, the CPVC resins obtained in Reference Examples 3 and 4 each required a longer time for blackening, and therefore, had a better thermal stability, as compared to the CPVC resin obtained in Comparative Example 3. Further, the CPVC resins obtained in Reference Examples 3 and 4 each had a higher Vicat softening temperature and therefore had a better heat resistance, as compared to the CPVC resin obtained in Comparative Example 3. When CPVC resins having substantially equal chlorine contents were to be produced, a total electric power consumption required for a chlorination reaction was much lower in Reference Examples 3 and 4 in each of which UV irradiation was carried out by use of a UV LED, as compared to Comparative Example 3 in which UV irradiation was carried out by use of a mercury lamp. This means that an energy saving effect was obtained and therefore, cost was reduced in Reference Examples 3 and 4.

Furthermore, as is clear from data in Table 3 above, the CPVC resin having a further improved initial colorability at the time of hot forming and a further improved thermal stability was obtained in Reference Example 3 employing UV LEDs that emit UV light having a peak wavelength of 365 nm for irradiation, as compared to Reference Example 4 employing UV LEDs that emit UV light having a peak wavelength of 385 nm for irradiation. Further, when CPVC resins having substantially equal chlorine contents were to be produced, a necessary total light intensity was lower, a reaction time was shorter, and further a reaction efficiency was higher in Reference Example 3 employing UV LEDs that emit UV light having a peak wavelength of 365 nm for irradiation, as compared to Reference Example 4 employing UV LEDs that emit UV light having a peak wavelength of 385 nm for irradiation.

Reference Example 5

Preparation of CPVC Resin

In Reference Example 5, a UV LED light source device 100b was used as in Reference Example 3.

Figure 16:
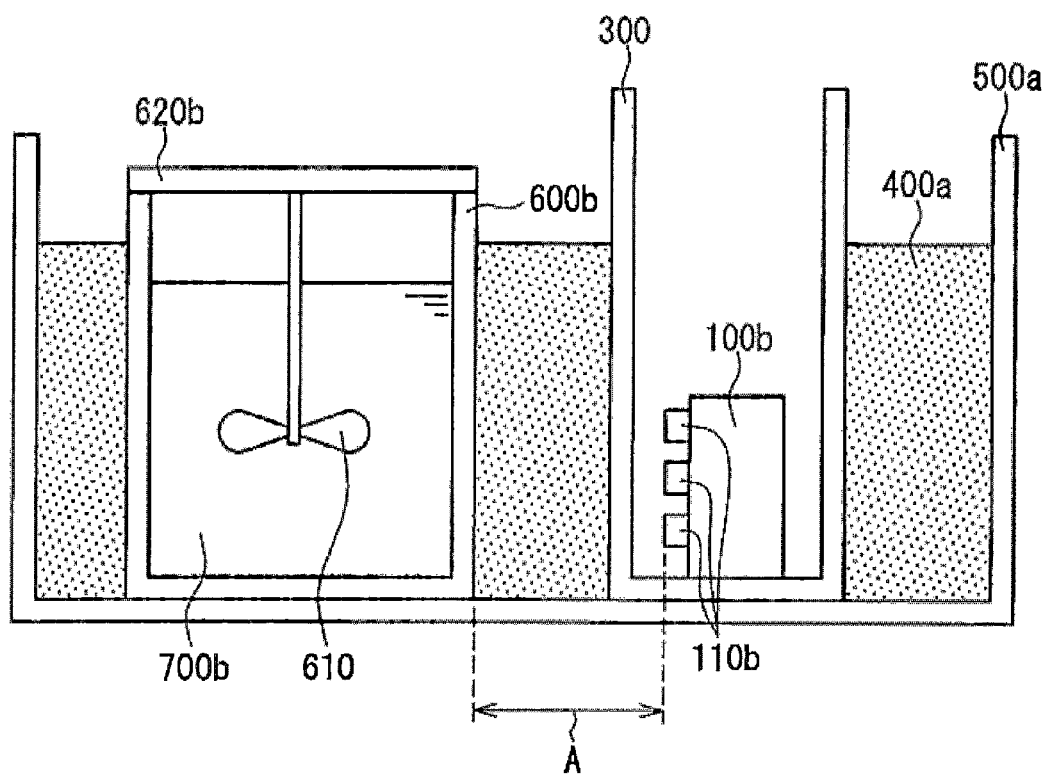
FIG. 16 is a schematic lateral cross-sectional view illustrating an apparatus for producing a CPVC resin, which apparatus includes a UV LED light source device and a reactor vessel that are used in Reference Example 5.

As illustrated in FIG. 16, the UV LED light source device 100b was put in a transparent glass cylindrical container 300 (PYREX (registered trademark)) (inner diameter: 75 mm, height: 400 mm, and thickness: 2.5 mm). Though not illustrated, aluminum foil was provided for the purpose of condensing light, so as to surround the LED light source device 100b. Then, a portion of the aluminum foil measuring 50 mm in length and 50 mm in width was cut out at a front part of the UV elements 100b, so that no light leaks out except from this part.

As illustrated in FIG. 16, in a water bath 500a in which warm water 400a at 25° C. was provided, the UV LED light source device 100b put in the cylindrical container 300 and a reactor vessel 600b (capacity: 10 L, PYREX (registered trademark)) that was a transparent glass container were placed. More specifically, the UV LED light source device 100b placed in the water bath 500a was arranged to face the reactor vessel 600b and have three UV LED elements 100b aligned at equal intervals of 15 mm in a line in a height direction. At this time, a distance A between the reactor vessel 600b and the UV LED elements 100b was set to 60 mm. Note that in the water bath 500a, a heat source (not illustrated) for keeping the temperature of the warm water 400a at a predetermined temperature was provided.

Next, into the reactor vessel 600b, 5.4 kg of pure water and 0.6 kg of a PVC resin (manufactured by Kaneka Corporation) were supplied. The PVC resin had a K-value of 66.7, an average particle diameter of 170 μm, and an apparent density of 0.568 g/ml. Then, the inside of the reactor vessel 600b was sealed with a cover 620b. Then, an aqueous slurry 700b of the PVC resin, that is, a mixture solution of pure water and the PVC resin was stirred at a rotational frequency of 800 rpm, by use of a turbine blade 610 of the reactor vessel 600b.

After vacuum degassing and nitrogen replacement in the reactor vessel 600b was carried out, chlorine gas was blown into the aqueous slurry 700b of the PVC resin. Simultaneously, while the aqueous slurry 700b of the PVC resin was being stirred by the turbine blade 610, UV irradiation from the UV LED elements 110b was carried out with respect to the aqueous slurry 700b of the PVC resin, so that a chlorination reaction was initiated. Note that chlorine gas was blown in carefully so that a pressure in the reactor vessel 600b was not reduced. During the chlorination reaction, the temperature of the warm water 400a in the water bath 500a was kept at 70° C.

When the chlorine content of the CPVC resin had reached 67.2%, UV irradiation by use of the UV LED elements 110b was ended. Thereby, the chlorination reaction was terminated. A chlorination reaction time that was a time required until the chlorine content of the CPVC resin reached 67.2%, that is, a time from the start to the end of UV irradiation was 309 minutes. Then, after unreacted chlorine in the CPVC resin was expelled with use of nitrogen gas, residual hydrochloric acid was removed by washing with water and thereafter, the CPVC resin was dried. Thereby, the CPVC resin was obtained.

Reference Example 6

Except that one UV-LED light source unit used in Reference Example 4 was used as a UV LED light source device, a CPVC resin was obtained as in Reference Example 5.

In Reference Example 6, a chlorination reaction time that was a time required until the chlorine content of the CPVC resin reached 67.2%, that is, a time from the start to the end of UV irradiation was 300 minutes.

Initial coloration at the time of hot forming, thermal stability and Vicat softening temperature of the CPVC resins obtained in Reference Examples 5 and 6 were measured and evaluated as in Reference Example 1.

As a result, as to the CPVC resin obtained in Reference Example 5, the YI was 91.9, the time required for blackening was 90 minutes, and the Vicat softening temperature was 117.1° C. Meanwhile, as to the CPVC resin obtained in Reference Example 6, the YI was 93.8, the time required for blackening was 90 minutes, and the Vicat softening temperature was 117.1° C. These results were shown together in Table 4 below.

Further, respective total light intensities in Reference Examples 5 and 6 were measured and calculated as in Reference Example 3. Results of such measurement and calculation were shown in Table 4 below.

TABLE 4

|  |  | Reference Example 5 | Reference Example 6 |
|---|---|---|---|
| Experimental Conditions | Light Source | UV LED | |
|  | Peak Wavelength (nm) | 365 | 385 |
|  | Number of LED Elements | 3 | 3 |
|  | Chlorination Reaction Time (min) | 309 | 300 |
|  | Total Light Intensity (mW) | 200 | 390 |
|  | Total Electric Power Consumption (W · h) | 115 | 111 |
| CPVC Resin | Chlorine Content (%) | 67.2 | 67.2 |
|  | Initial Coloration (YI) at Hot Forming | 91.9 | 93.8 |
|  | Thermal Stability (min) | 90 | 90 |
|  | Vicat Softening Temperature (° C.) | 117.1 | 117.1 |

As is clear from data in Table 4 above, the CPVC resin having a better initial colorability at the time of hot forming was obtained in Reference Example 5 employing UV LEDs that emit UV light having a peak wavelength of 365 nm for irradiation, as compared to Reference Example 6 employing UV LEDs that emit UV light having a peak wavelength of 385 nm for irradiation. Further, when CPVC resins having substantially equal chlorine contents were to be produced, a reaction time was substantially equal and a necessary total light intensity was half as much in Reference Example 5 employing UV LEDs that emit UV light having a peak wavelength of 365 nm for irradiation, as compared to Reference Example 6 employing UV LEDs that emit UV light having a peak wavelength of 385 nm for irradiation. Reference Examples 5 and 6 were not different in total electric power consumption.

Preparation of CPVC Resin

Example 1

As illustrated in FIG. 17, to an aqueous slurry outlet provided at the bottom of a reactor vessel 600c with a jacket, a PVC duct 800a for aqueous slurry circulation was connected. To the end of this PVC duct 800a, a transparent glass tube 810 was provided. Further, before the transparent glass tube 810, a pressure reducing valve 4 was provided. Accordingly, a pressure of a slurry was reduced before the slurry enters the transparent glass tube 810. Further to the end of the transparent glass tube 810, a PVC duct 800b for aqueous slurry circulation, a pump 900 for aqueous slurry circulation, and a PVC duct 800c for aqueous slurry circulation were connected in this order. Then, an outlet portion of the PVC duct 800c for aqueous slurry circulation was connected to a gas phase part in the reactor vessel 600c with the jacket. Note that the reactor vessel 600c with the jacket was provided with a cover 620c.

Figure 18:
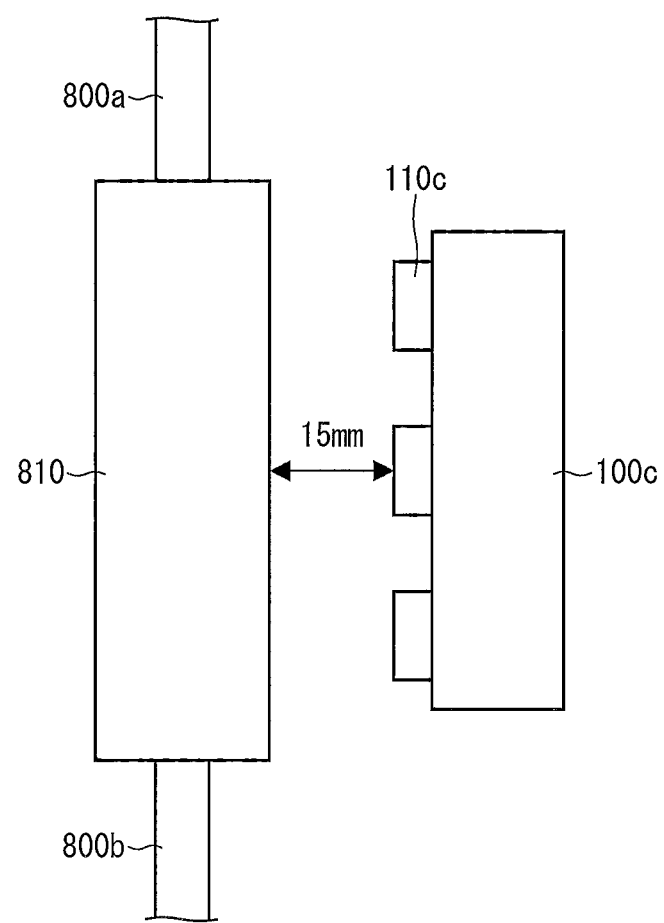
FIG. 18 is a view magnifying a part of the apparatus illustrated in FIG. 17.

FIG. 18 is a view in which portions of the transparent glass tube 810 and a light source for UV irradiation in an apparatus of FIG. 17 are magnified. As illustrated in FIG. 18, a UV-LED light source unit (manufactured by Sentec Corporation Ltd.) 100c (hereinafter, also referred to as a UV LED light source device 100c) was provided, as a light source for UV irradiation, at a position 15 mm apart from a surface of the transparent glass tube 810. The UV LED light source device 100c has twelve UV LED elements 110c (manufactured by Nichia Corporation, product number: NC4U133A, forward current: 500 mA, forward voltage: 14.9 V) having a peak wavelength of 365 mm. These UV LED elements 110c were provided at equal intervals of 15 mm in a vertical direction. As illustrated in FIG. 18, the UV LED elements 110c were arranged so that UV irradiation was carried out with respect to an aqueous slurry flowing inside the transparent glass duct 810. Note that only three of the UV LED elements 110c of the UV LED light source device 100c were illustrated in FIG. 18 due to limitation of space.

An emission spectrum of the UV LED elements 110c used in Example 1 was as shown in FIG. 9. As illustrated in FIG. 9, UV light emitted for irradiation by the UV LED elements 110c had a wavelength range of 350 nm to 392 nm and one peak whose wavelength was 365 nm. Here, the wavelength range means, as described above, a range of wavelengths in the emission spectrum which wavelengths has a relative emission intensity that is higher by 2% or more relative to a relative emission intensity at the peak wavelength.

Next, into the reactor vessel 600c with the jacket, 35 kg of pure water and 15 kg of a PVC resin (manufactured by Kaneka Corporation) were supplied. The PVC resin had a K-value of 66.4, an average particle diameter of 200 μm, and an apparent density of 0.557 g/ml. Then, the inside of the reactor vessel 600c with the jacket was sealed by placing the cover 620c. Further, an aqueous slurry 700c of the PVC resin, that is, a mixture solution of pure water and the PVC resin was stirred at a rotational frequency of 590 rpm, by use of a turbine blade 610c (diameter: 180 mm) of the reactor vessel 600c. Simultaneously, the aqueous slurry 700c was circulated in the device by use of the pump 900 for aqueous slurry circulation.

Then, after vacuum degassing and nitrogen replacement in the reactor vessel 600c with the jacket was carried out, vacuum degassing was carried out again. Then, chlorine gas was blown into the aqueous slurry 700c of the PVC resin via a chlorine introducing section (not illustrated). Simultaneously, while the aqueous slurry 700c of the PVC resin was being stirred by the turbine blade 610c, UV irradiation from the UV LED elements 110c was carried out. The aqueous slurry 700c of the PVC resin was irradiated with UV light via the transparent glass duct 810, so that a chlorination reaction was initiated. After initiation of the chlorination reaction (start of UV irradiation), pressure was applied inside the reactor vessel 600c with the jacket by introduction of chlorine gas, until the pressure inside the reactor vessel 600c was increased up to 0.02 MPa. Thereafter, the pressure was kept at 0.06 MPa during the chlorination reaction (during UV irradiation). The temperature inside the reactor vessel 600c was increased up to 500° C. over 25 minutes from the start of the nitrogen replacement, and further, increased to 85° C. over 100 minutes from the initiation of the chlorination reaction (the start of the UV irradiation). Thereafter, the temperature was kept at 85° C. during the chlorination reaction (during UV irradiation).

When the chlorine content of the CPVC resin had reached 67.1%, UV irradiation by use of the UV LED elements 110c was ended. Thereby, the chlorination reaction was terminated. A time required until the chlorine content of the CPVC resin reached 67.1% was defined as a reaction time. In other words, the reaction time is a time from the start to the end of UV irradiation. This reaction time was 137 minutes. Then, after unreacted chlorine in the CPVC resin was expelled with use of nitrogen gas, residual hydrochloric acid was removed by washing with water and thereafter, the CPVC resin was dried. Thereby, the CPVC resin was obtained.

Example 2

Except that the pressure inside the reactor vessel 600c with the jacket was set to 0.1 MPa during a chlorination reaction, a CPVC resin was obtained as in Example 1. In Example 2, a time required until the chlorine content of the CPVC resin reached 67.1% (a reaction time of the chlorination reaction, that is, a time from the start to the end of UV irradiation; the same below) was 128 minutes.

Example 3

Except that the pressure inside the reactor vessel 600c with the jacket was set to 0.12 MPa during a chlorination reaction, a CPVC resin was obtained as in Example 1. In Example 3, a time required until the chlorine content of the CPVC resin reached 67.1% was 123 minutes.

Example 4

Except that the pressure inside the reactor vessel 600c with the jacket was set to 0.14 MPa during a chlorination reaction, a CPVC resin was obtained as in Example 1. In Example 4, a time required until the chlorine content of the CPVC resin reached 67.1% was 125 minutes.

Example 5

Except that the pressure inside the reactor vessel 600c with the jacket was set to 0.02 MPa during a chlorination reaction, a CPVC resin was obtained as in Example 1. In Example 5, a time required until the chlorine content of the CPVC resin reached 67.1% was 144 minutes.

Comparative Example 4

As a comparative example, one glass cylindrical container was placed in a reactor vessel with a jacket and production of a CPVC resin was attempted. In the glass cylindrical container, a UV light source that was the same as the UV LED light source device 100c was provided. As in Example 1, water and a PVC resin were supplied into the above reactor vessel, and the inside of the reactor vessel was sealed with a cover. Then, an aqueous slurry of the PVC resin, that is, a mixture of pure water and the PVC resin was stirred at a rotational frequency of 590 rpm by use of a turbine blade (diameter 180 mm) of the reactor vessel.

At a point when a pressure inside the reactor vessel was increased with chlorine up to 0.02 MPa, the cylindrical container was broken. Therefore, no CPVC resin could be produced.

Comparative Example 5

Except that the pressure inside the reactor vessel 600c with the jacket was set to 0.01 MPa during a chlorination reaction, a CPVC resin was obtained as in Comparative Example 4. In Comparative Example 5, a time required until the chlorine content of the CPVC resin reached 67.1% was 155 minutes.

Example 8

Except that the pressure inside the reactor vessel 600c with the jacket was set to 0.08 MPa during a chlorination reaction, a CPVC resin was obtained as in Example 6. In Example 8, a time required until the chlorine content of the CPVC resin reached 67.1% was 128 minutes.

Example 9

Except that the pressure inside the reactor vessel 600c with the jacket was set to 0.02 MPa during a chlorination reaction, a CPVC resin was obtained as in Example 6. In Example 7, a time required until the chlorine content of the CPVC resin reached 67.1% was 153 minutes.

TABLE 5

|  | Example 1 | Example 2 | Example 3 | Example 4 | Example 5 | Comparative Example 4 | Comparative Example 5 |
|---|---|---|---|---|---|---|---|
| Pressure inside Reactor [MPa] | 0.06 | 0.10 | 0.12 | 0.14 | 0.02 | 0.02 | 0.01 |
| Reaction Time [min] | 137 | 128 | 123 | 125 | 144 | Unmeasurable due to Container Breakage | 155 |

As shown in Examples 1 to 5, it was confirmed that increasing a pressure inside the reactor vessel (up to 0.02 MPa to 0.14 MPa) achieves, as an effect, a shorter chlorination reaction time.

Further, in a case where a UV LED light source device put in a glass cylindrical container was inserted in the reactor vessel as described in Comparative Example 4, the cylindrical container of the light source was unable to endure the pressure applied inside the reactor vessel and consequently was broken. Meanwhile, in a case where as described in Comparative Example 5, the pressure inside the reactor vessel was set to a pressure (0.01 MPa) that the cylindrical container of the light source could endure, a chlorination reaction time was long.

Example 6

Except that a polyamide chloride resin of a material used here was changed to a polyamide chloride resin (manufactured by Kaneka Corporation) having a K-value of 58.4, an average particle diameter of 150 μm, and an apparent density of 0.574 g/ml and that the pressure inside the reactor vessel 600c with the jacket was changed to 0.04 MPa during a chlorination reaction, a CPVC resin was obtained as in Example 1. In Example 6, a time required until the chlorine content of the CPVC resin reached 67.1% was 140 minutes.

Example 7

Except that the pressure inside the reactor vessel 600c with the jacket was set to 0.06 MPa during a chlorination reaction, a CPVC resin was obtained as in Example 6. In Example 7, a time required until the chlorine content of the CPVC resin reached 67.1% was 135 minutes.

TABLE 6

|  | Example 6 | Example 7 | Example 8 | Example 9 |
|---|---|---|---|---|
| Pressure Inside Reactor [MPa] | 0.04 | 0.06 | 0.08 | 0.02 |
| Reaction Time [min] | 140 | 135 | 128 | 153 |

As shown in Examples 6 to 9, even in a case where a PVC resin having a different K-value, it was similarly confirmed that increasing a pressure inside the reactor vessel (up to 0.02 MPa to 0.08 MPa) achieves, as an effect, a shorter chlorination reaction time.

Note that the reaction time of Reference Examples and the reaction time of Examples of the subject application are different from each other in PVC resin used as a material as well as in a level that the chlorine content reaches (in Reference Examples, a level that the chlorine content reaches is low), and therefore cannot be compared with each other unconditionally. Therefore, it is additionally stated just to make certain, that the effects of the invention of the present application can be understood by comparing Examples 1 to 5 and Comparative Examples 4 and 5 in which conditions such as a material and a level that a chlorination content reaches are arranged to be the same.

INDUSTRIAL APPLICABILITY

A CPVC resin obtained by the present invention has excellent characteristics such a high mechanical strength, a high weather resistance, and a high chemical resistance. Further, the CPVC resin obtained by the present invention is superior in heat resistance to PVC resins. Therefore, the CPVC resin obtained by the present invention is applicable in various industrial fields.

REFERENCE SIGNS LIST

1: chlorine introducing section (pressure applying section)
2: first tank
6, 6', 6": second tank
7: slurry circulating line
11: apparatus for producing a CPVC resin
12: slurry of a PVC resin
20: UV irradiation panel
21: UV LED element
22: transparent duct
25: transparent duct provided with a static mixer
26: metal duct
27: transparent window

The invention claimed is:

1. A method for producing a chlorinated vinyl chloride-based resin, the method comprising the steps of:
   introducing chlorine into a slurry of a vinyl chloride-based resin in a first tank;
   transferring, from the first tank to a second tank, the slurry into which chlorine has been introduced;
   irradiating, with UV light, the slurry in the second tank; and
   circulating the slurry having been irradiated with UV light in the second tank to the first tank.

2. The method as set forth in claim 1, wherein pressure is applied inside the first tank.

3. The method as set forth in claim 2, wherein a pressure inside the first tank is in a range of 0.02 MPa to 2 MPa.

4. The method as set forth in claim 1, further comprising the step of introducing chlorine into the slurry taken out from the second tank before the slurry taken out from the second tank is transferred back to the first tank.

5. The method as set forth in claim 1, further comprising the step of introducing the slurry to a gas phase part or a part in the vicinity of a gas-liquid phase boundary in the first tank when the slurry is circulated from the second tank to the first tank.

6. The method as set forth in claim 1, wherein, in the step of irradiating the slurry with UV light, at least one kind of light source selected from the group consisting of a UV LED, an organic EL, an inorganic EL and a UV laser is used for irradiation.

7. An apparatus for producing a chlorinated vinyl chloride-based resin, the apparatus comprising:
   a first tank where chlorine is introduced into a slurry of a vinyl chloride-based resin;
   a second tank into which the slurry is introduced from the first tank and in which chlorination is carried out, the second tank being provided with a light source for UV irradiation to the slurry; and
   a circulating section circulating the slurry having been irradiated with UV light in the second tank to the first tank.

8. The apparatus as set forth in claim 7, further comprising a pressure applying section applying pressure to the first tank.

9. The apparatus as set forth in claim 8, wherein a pressure inside the first tank is set to 0.02 MPa to 2 MPa.

10. The apparatus as set forth in claim 7, further comprising a second chlorine introducing section introducing chlorine into the slurry taken out from the second tank.

11. The apparatus as set forth in claim 7, wherein the circulating section is configured to introduce the slurry to a gas phase part or a part in the vicinity of a gas-liquid phase boundary in the first tank.

12. The apparatus as set forth in claim 7, wherein the light source is at least one kind of light source selected from the group consisting of a UV LED, an organic EL, an inorganic EL and a UV laser.

* * * * *